United States Patent
Kubota et al.

(10) Patent No.: US 9,341,237 B2
(45) Date of Patent: May 17, 2016

(54) BICYCLE CHAIN CONNECTING LINK

(71) Applicant: SHIMANO INC., Sakai (JP)

(72) Inventors: Toru Kubota, Sakai (JP); Fujihisa Tatsumi, Sakai (JP); Tsuyoshi Fukumori, Sakai (JP)

(73) Assignee: SHIMANO INC., Sakai (JP)

( * ) Notice: Subject to any disclaimer, the term of this patent is extended or adjusted under 35 U.S.C. 154(b) by 94 days.

(21) Appl. No.: 14/207,504

(22) Filed: Mar. 12, 2014

(65) Prior Publication Data

US 2015/0260258 A1 Sep. 17, 2015

(51) Int. Cl.
*F16G 15/10* (2006.01)
*F16G 13/02* (2006.01)
*F16G 15/00* (2006.01)
*F16G 15/04* (2006.01)

(52) U.S. Cl.
CPC ................................. *F16G 15/04* (2013.01)

(58) Field of Classification Search
CPC ......... F16G 13/06; F16G 15/00; F16G 15/02; F16G 13/02; Y10T 403/32893
USPC ........................... 474/206, 218, 220, 219, 227
See application file for complete search history.

(56) References Cited

U.S. PATENT DOCUMENTS

| | | | | |
|---|---|---|---|---|
| 610,583 | A * | 9/1898 | Fox | F16G 13/06 139/333 |
| 1,570,440 | A * | 1/1926 | Holmes | F16G 13/06 474/218 |
| 4,043,215 | A * | 8/1977 | Long | F16G 13/06 474/218 |
| 5,186,569 | A * | 2/1993 | Wu | F16G 13/06 403/154 |
| 5,291,730 | A * | 3/1994 | Wu | F16G 15/00 474/220 |
| 5,305,594 | A * | 4/1994 | Wang | F16G 15/02 474/206 |
| 5,362,282 | A * | 11/1994 | Lickton | F16G 15/02 474/220 |
| 5,400,585 | A * | 3/1995 | Wang | F16G 13/06 474/206 |
| 6,390,943 | B1 * | 5/2002 | Dreger | F16G 15/00 474/220 |
| 7,543,437 | B1 * | 6/2009 | Chin | F16G 13/06 474/218 |
| 7,712,298 | B1 * | 5/2010 | Wang | F16G 13/06 474/218 |
| 7,722,492 | B2 * | 5/2010 | Santos | F16G 15/00 474/206 |
| 7,837,584 | B2 * | 11/2010 | Wu | F16G 13/06 474/218 |
| 7,914,410 | B2 * | 3/2011 | Oishi | F16G 13/06 474/220 |
| 8,540,597 | B2 * | 9/2013 | Wang | F16G 13/06 403/118 |
| 2007/0197333 | A1* | 8/2007 | Santos | F16G 15/00 474/227 |
| 2007/0249448 | A1* | 10/2007 | Wu | F16G 15/00 474/206 |
| 2007/0249449 | A1* | 10/2007 | Wu | F16G 13/02 474/206 |
| 2009/0247339 | A1* | 10/2009 | Chin | F16G 13/06 474/206 |

* cited by examiner

*Primary Examiner* — Henry Liu
(74) *Attorney, Agent, or Firm* — Mori & Ward LLP

(57) ABSTRACT

A bicycle chain connecting link comprises a link pin and a link plate. The link pin has a center axis and comprises a main-body, a head portion, and an intermediate portion. The intermediate portion has an outer diameter smaller than an outer diameter of the main-body and than an outer diameter of the head portion to define a groove between the main-body and the head portion. The link plate comprises an elongated opening to which the link pin is removably attached. The elongated opening comprises an insertion opening and an attachment opening connected with the insertion opening. The guiding portion includes a sliding surface slidable with the head portion. The protrusion is provided between the insertion opening and the attachment opening and protrudes from the sliding surface to be slidable with an outer periphery of the head portion.

33 Claims, 16 Drawing Sheets

BICYCLE CHAIN CONNECTING LINK

BACKGROUND OF THE INVENTION

1. Field of the Invention

The present invention relates to a bicycle chain connecting link.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle chain.

Most bicycles have a drive train that uses a bicycle chain to transmit the pedaling action from the rider to the rear wheel. The bicycle chain has a plurality of inner links and a plurality of outer links that are interconnected in an alternating manner by a plurality of pins. Typically, each of the inner links includes a pair of inner plates. Each of the outer links includes a pair of outer plates. One end of the bicycle chain is connected to the other end of the bicycle chain using a connecting link.

SUMMARY OF THE INVENTION

In accordance with a first aspect of the present invention, a bicycle chain connecting link comprises a link pin and a link plate. The link pin has a center axis and comprises a main-body, a head portion, and an intermediate portion. The main-body extends along the center axis. The head portion is spaced apart from the main-body along the center axis. The intermediate portion is provided between the main-body and the head portion and couples the head portion to the main-body. The intermediate portion has an outer diameter smaller than an outer diameter of the main-body and than an outer diameter of the head portion to define a groove between the main-body and the head portion. The link plate comprises an elongated opening to which the link pin is removably attached. The elongated opening comprises an insertion opening and an attachment opening connected with the insertion opening. The guiding portion protrudes inwardly from an inner periphery of the elongated opening and is configured to engage with the groove of the link pin to guide the link pin between the insertion opening and the attachment opening. The guiding portion includes a sliding surface slidable with the head portion. The protrusion is provided between the insertion opening and the attachment opening and protrudes from the sliding surface to be slidable with an outer periphery of the head portion.

In accordance with a second aspect of the present invention, the bicycle chain connecting link according to the first aspect is configured so that a total length of the guiding portion and the protrusion is defined in an axial direction parallel to the center axis. The total length of the guiding portion and the protrusion is longer than a minimum axial distance defined between the head portion and the main-body in the axial direction parallel to the center axis.

In accordance with a third aspect of the present invention, the bicycle chain connecting link according to the second aspect is configured so that the link plate further comprises an additional guiding portion and an additional protrusion. The additional guiding portion protrudes inwardly from the inner periphery of the elongated opening and is configured to engage with the groove of the link pin to guide the link pin between the insertion opening and the attachment opening. The additional guiding portion includes an additional sliding surface slidable with the head portion. The additional protrusion is provided between the insertion opening and the attachment opening and protrudes from the additional sliding surface to be slidable with the outer periphery of the head portion.

In accordance with a fourth aspect of the present invention, the bicycle chain connecting link according to the third aspect is configured so that a total length of the additional guiding portion and the additional protrusion is defined in the axial direction. The total length of the additional guiding portion and the additional protrusion is longer than the minimum axial distance defined between the head portion and the main-body in the axial direction.

In accordance with a fifth aspect of the present invention, the bicycle chain connecting link according to the third aspect is configured so that the additional guiding portion is spaced apart from the guiding portion to define, between the guiding portion and the additional guiding portion, a sliding passage through which the intermediate portion of the link pin is to pass. The additional protrusion is spaced apart from the protrusion to define a minimum distance between the protrusion and the additional protrusion. The minimum distance between the protrusion and the additional protrusion is shorter than the outer diameter of the head portion.

In accordance with a sixth aspect of the present invention, the bicycle chain connecting link according to the fifth aspect is configured so that the additional guiding portion is spaced apart from the guiding portion to define a sliding-passage width between the guiding portion and the additional guiding portion. The minimum distance between the protrusion and the additional protrusion is longer than the sliding-passage width defined at a position at which the minimum distance is defined when viewed from the axial direction.

In accordance with a seventh aspect of the present invention, the bicycle chain connecting link according to the first aspect is configured so that the link plate further comprises a tapered surface inclined with respect to an axial direction parallel to the center axis to guide the head portion into the insertion opening.

In accordance with an eighth aspect of the present invention, a bicycle chain connecting link comprises a first link pin, a second link pin, a first link plate, and a second link plate. The first link pin has a first center axis and comprises a first main-body, a first head portion, and a first intermediate portion. The first main-body extends along the first center axis. The first head portion is spaced apart from the first main-body along the first center axis. The first intermediate portion is provided between the first main-body and the first head portion and couples the first head portion to the first main-body. The first intermediate portion has an outer diameter smaller than an outer diameter of the first main-body and than an outer diameter of the first head portion to define a first groove between the first main-body and the first head portion. The second link pin has a second center axis and comprises a second main-body, a second head portion, and a second intermediate portion. The second main-body extends along the second center axis. The second head portion is spaced apart from the second main-body along the second center axis. The second intermediate portion is provided between the second main-body and the second head portion and couples the second head portion to the second main-body. The second intermediate portion has an outer diameter smaller than an outer diameter of the second main-body and than an outer diameter of the second head portion to define a second groove between the second main-body and the second head portion. The first link plate comprises a first securing portion, a first elongated opening, a first guiding portion, and a first protrusion. The first main-body of the first link pin is secured to the first securing portion. The second link pin is removably attached to the first elongated opening. The first elongated opening comprises a first insertion opening and a first attachment opening connected with the first insertion opening. The first guiding portion protrudes inwardly from an inner periphery of the first elongated opening and is configured to engage with the second groove of the second link pin to guide the second link pin between the first insertion opening and the first attachment opening. The first guiding portion includes a first sliding surface slidable with the second head portion. The first protrusion is provided between the first insertion opening and the first attachment opening and protrudes from the first sliding surface to be slidable with an outer periphery of the second head portion. The second link plate comprises a second securing portion and a second elongated opening. The second main-body of the second link pin is secured to the second securing portion. The first link pin is removably attached to the second elongated opening.

In accordance with a ninth aspect of the present invention, the bicycle chain connecting link according to the eighth aspect is configured so that a first total length of the first guiding portion and the first protrusion is defined in a first axial direction parallel to the first center axis. The first total length is longer than a second minimum axial distance defined between the second head portion and the second main-body in a second axial direction parallel to the second center axis.

In accordance with a tenth aspect of the present invention, the bicycle chain connecting link according to the ninth aspect is configured so that the first link plate further comprises a first additional guiding portion and a first additional protrusion. The first additional guiding portion protrudes inwardly from the inner periphery of the first elongated opening and is configured to engage with the second groove of the second link pin to guide the second link pin between the first insertion opening and the first attachment opening. The first additional guiding portion includes a first additional sliding surface slidable with the second head portion. The first additional protrusion is provided between the first insertion opening and the first attachment opening and protrudes from the first additional sliding surface to be slidable with the outer periphery of the second head portion. A second total length of the first additional guiding portion and the first additional protrusion is defined in the first axial direction. The second total length is longer than the second minimum axial distance defined between the second head portion and the second main-body in the second axial direction.

In accordance with an eleventh aspect of the present invention, the bicycle chain connecting link according to the ninth aspect is configured so that the first additional guiding portion is spaced apart from the first guiding portion to define, between the first guiding portion and the first additional guiding portion, a first sliding passage through which the second intermediate portion of the second link pin is to pass. The first additional protrusion is spaced apart from the first protrusion to define a first minimum distance between the first protrusion and the first additional protrusion. The first minimum distance is shorter than the outer diameter of the second head portion.

In accordance with a twelfth aspect of the present invention, the bicycle chain connecting link according to the eleventh aspect is configured so that the first additional guiding portion is spaced apart from the first guiding portion to define a first sliding-passage width between the first guiding portion and the first additional guiding portion. The first minimum distance is longer than the first sliding-passage width defined at a position at which the first minimum distance is defined when viewed from the first axial direction.

In accordance with a thirteenth aspect of the present invention, the bicycle chain connecting link according to the eighth aspect is configured so that the first link plate further comprises a first outer surface and a first inner surface opposite to the first outer surface in a first axial direction parallel to the first center axis. The first inner surface is closer to the first head portion than the first outer surface in the first axial direction. The first protrusion has a first surface facing in the first axial direction and disposed at a position same as the first outer surface in the first axial direction.

In accordance with a fourteenth aspect of the present invention, the bicycle chain connecting link according to the eighth aspect is configured so that the first link plate further comprises a first outer surface and a first inner surface opposite to the first outer surface in a first axial direction parallel to the first center axis. The first inner surface is closer to the first head portion than the first outer surface in the first axial direction. The first protrusion has a first surface facing in the first axial direction and disposed at a position different from the first outer surface in the first axial direction.

In accordance with a fifteenth aspect of the present invention, the bicycle chain connecting link according to the eighth aspect is configured so that the first link plate further comprises a first tapered surface inclined with respect to the first axial direction parallel to the first center axis to guide the second head portion into the first insertion opening.

In accordance with a sixteenth aspect of the present invention, the bicycle chain connecting link according to the fifteenth aspect is configured so that the first link plate further comprises a first outer surface and a first inner surface opposite to the first outer surface in the first axial direction. The first inner surface is closer to the first head portion than the first outer surface in the first axial direction. The first tapered surface is inclined with respect to the first axial direction such that an inner radius defined by the first tapered surface gradually decreases from the first inner surface toward the first outer surface.

In accordance with a seventeenth aspect of the present invention, the bicycle chain connecting link according to the eighth aspect is configured so that the first link plate further comprises a first outer surface and a first inner surface opposite to the first outer surface in a first axial direction parallel to the first center axis. The first inner surface is closer to the first head portion than the first outer surface in the first axial direction. The first link plate includes a first stopper protruding from the first inner surface and provided between the first securing portion and the first elongated opening.

In accordance with an eighteenth aspect of the present invention, the bicycle chain connecting link according to the seventeenth aspect is configured so that the first elongated opening is spaced apart from the first securing portion in a first longitudinal direction of the first link plate. The first stopper includes a first restricting surface to restrict a relative movement between the first link plate and an inner link plate in the first longitudinal direction.

In accordance with a nineteenth aspect of the present invention, the bicycle chain connecting link according to the seventeenth aspect is configured so that the first stopper is provided by one of punching and cutting.

In accordance with a twentieth aspect of the present invention, the bicycle chain connecting link according to the nineteenth aspect is configured so that the first stopper is formed so that an inner periphery of the first insertion opening is at least partially raised.

In accordance with a twenty-first aspect of the present invention, the bicycle chain connecting link according to the eighth aspect is configured so that the first link plate includes a first cutout provided on the inner periphery of the first elongated opening and disposed between the first securing portion and the first elongated opening.

In accordance with a twenty-second aspect of the present invention, the bicycle chain connecting link according to the eighth aspect is configured so that the second elongated opening comprises a second insertion opening and a second attachment opening connected with the second insertion opening. The second link plate further comprises a second guiding portion and a second protrusion. The second guiding portion protrudes inwardly from an inner periphery of the second elongated opening and is configured to engage with the first groove of the first link pin to guide the first link pin between the second insertion opening and the second attachment opening. The second guiding portion includes a second sliding surface slidable with the first head portion. The second protrusion is provided between the second insertion opening and the second attachment opening and protrudes from the second sliding surface to be slidable with an outer periphery of the first head portion.

In accordance with a twenty-third aspect of the present invention, the bicycle chain connecting link according to the twenty-second aspect is configured so that a third total length of the second guiding portion and the second protrusion is defined in a second axial direction parallel to the second center axis. The third total length is longer than a first minimum axial distance defined between the first head portion and the first main-body in a first axial direction parallel to the first center axis.

In accordance with a twenty-fourth aspect of the present invention, a bicycle chain connecting link comprises a first link pin, a second link pin, a first link plate, and a second link plate. The first link pin has a first center axis and comprises a first main-body, a first head portion, and a first intermediate portion. The first main-body extends along the first center axis. The first head portion is spaced apart from the first main-body along the first center axis. The first intermediate portion is provided between the first main-body and the first head portion and couples the first head portion to the first main-body. The first intermediate portion has an outer diameter smaller than an outer diameter of the first main-body and than an outer diameter of the first head portion to define a first groove between the first main-body and the first head portion. The second link pin has a second center axis and comprises a second main-body, a second head portion, and a second intermediate portion. The second main-body extends along the second center axis. The second head portion is spaced apart from the second main-body along the second center axis. The second intermediate portion is provided between the second main-body and the second head portion and couples the second head portion to the second main-body. The second intermediate portion has an outer diameter smaller than an outer diameter of the second main-body and than an outer diameter of the second head portion to define a second groove between the second main-body and the second head portion. The first link plate comprises a first securing portion, a first elongated opening, and a first tapered surface. The first main-body of the first link pin is secured to the first securing portion. The second link pin is removably attached to the first elongated opening. The first elongated opening comprises a first insertion opening and a first attachment opening. The second head portion is to be inserted into the first insertion opening when the second link pin is attached to the first link plate. The first attachment opening is connected with the first insertion opening. The first tapered surface is inclined with respect to a first axial direction parallel to the first center axis to guide the second head portion into the first insertion opening. The second link plate comprises a second securing portion and a second elongated opening. The second main-body of the second link pin is secured to the second securing portion. The first link pin is removably attached to the second elongated opening.

In accordance with a twenty-fifth aspect of the present invention, the bicycle chain connecting link according to the twenty-fourth aspect is configured so that the first link plate further comprises a first outer surface and a first inner surface. The first inner surface is opposite to the first outer surface in the first axial direction. The first inner surface is closer to the first head portion than the first outer surface in the first axial direction. The inner radius defined by the first tapered surface gradually decreases from the first inner surface toward the first outer surface.

In accordance with a twenty-sixth aspect of the present invention, the bicycle chain connecting link according to the twenty-fifth aspect is configured so that the first link plate includes a first stopper protruding from the first inner surface and provided between the first securing portion and the first elongated opening.

In accordance with a twenty-seventh aspect of the present invention, the bicycle chain connecting link according to the twenty-sixth aspect is configured so that the first elongated opening is spaced apart from the first securing portion in a first longitudinal direction of the first link plate. The first stopper includes a first restricting surface to restrict a relative movement between the first link plate and an inner link plate in the first longitudinal direction.

In accordance with a twenty-eighth aspect of the present invention, the bicycle chain connecting link according to the twenty-sixth aspect is configured so that the first stopper is provided by one of punching and cutting.

In accordance with a twenty-ninth aspect of the present invention, the bicycle chain connecting link according to the twenty-eighth aspect is configured so that the first stopper is formed so that an inner periphery of the first insertion opening is at least partially raised.

In accordance with a thirtieth aspect of the present invention, the bicycle chain connecting link according to the twenty-fourth aspect is configured so that the first link plate includes a first cutout provided on an inner periphery of the first elongated opening and disposed between the first securing portion and the first elongated opening.

In accordance with a thirty-first aspect of the present invention, the bicycle chain connecting link according to the twenty-fourth aspect is configured so that the second link plate further comprises a second outer surface and a second inner surface opposite to the second outer surface in a second axial direction parallel to the second center axis. The second inner surface is closer to the second head portion than the second outer surface in the second axial direction. The second elongated opening comprises a second insertion opening and a second attachment opening. The first head portion is to be inserted into the second insertion opening when the first link pin is attached to the second link plate. The second attachment opening is connected with the second insertion opening. The second link plate further comprises a second tapered surface inclined with respect to the second axial direction to guide the first head portion into the second insertion opening. An inner radius defined by the second tapered surface gradually decreasing from the second inner surface toward the second outer surface.

In accordance with a thirty-second aspect of the present invention, a bicycle chain connecting link comprises a link pin and a link plate. The link pin has a center axis and comprises a main-body, a head portion, and an intermediate portion. The main-body extends along the center axis. The head portion is spaced apart from the main-body along the center axis. The intermediate portion is provided between the main-body and the head portion and couples the head portion to the main-body. The intermediate portion has an outer diameter smaller than an outer diameter of the main-body and than an outer diameter of the head portion to define a groove between the main-body and the head portion. The link plate comprises an elongated opening and a tapered surface. The elongated opening comprises an insertion opening and an attachment opening. The head portion is to be inserted into the insertion opening when the link pin is attached to the link plate. The attachment opening is connected with the insertion opening. The tapered surface is inclined with respect to an axial direction to guide the head portion into the insertion opening. The axial direction is parallel to the center axis.

In accordance with a thirty-third aspect of the present invention, the bicycle chain connecting link according to the thirty-second aspect is configured so that the link plate further comprises an outer surface and an inner surface opposite to the outer surface in the axial direction. An inner radius defined by the tapered surface gradually decreases from the inner surface toward the outer surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
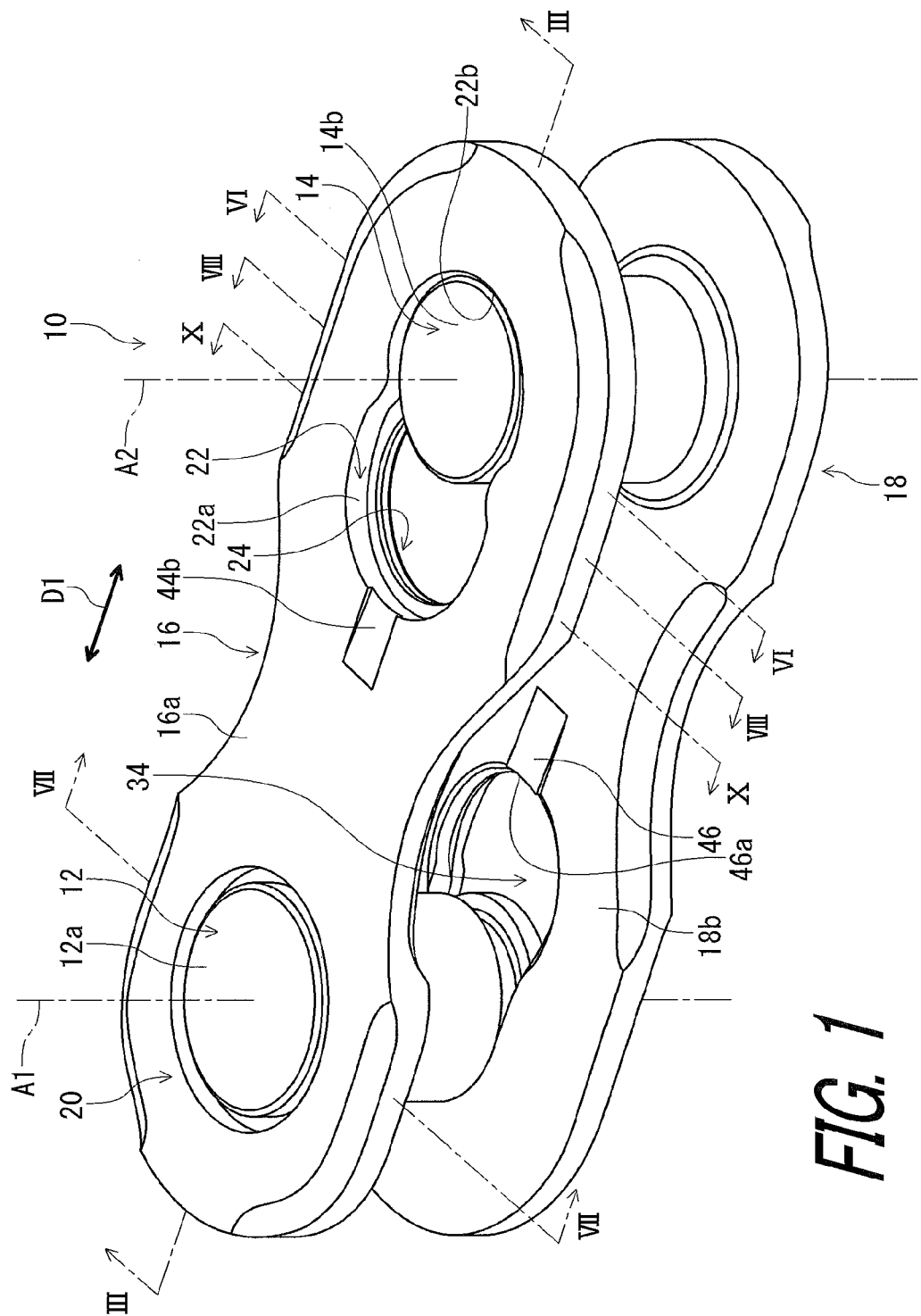
FIG. 1 is a perspective view of a bicycle chain connecting link in accordance with a first embodiment.

The embodiments will now be described with reference to the accompanying drawings, wherein like reference numerals designate corresponding or identical elements throughout the various drawings.

First Embodiment

Figure 2:
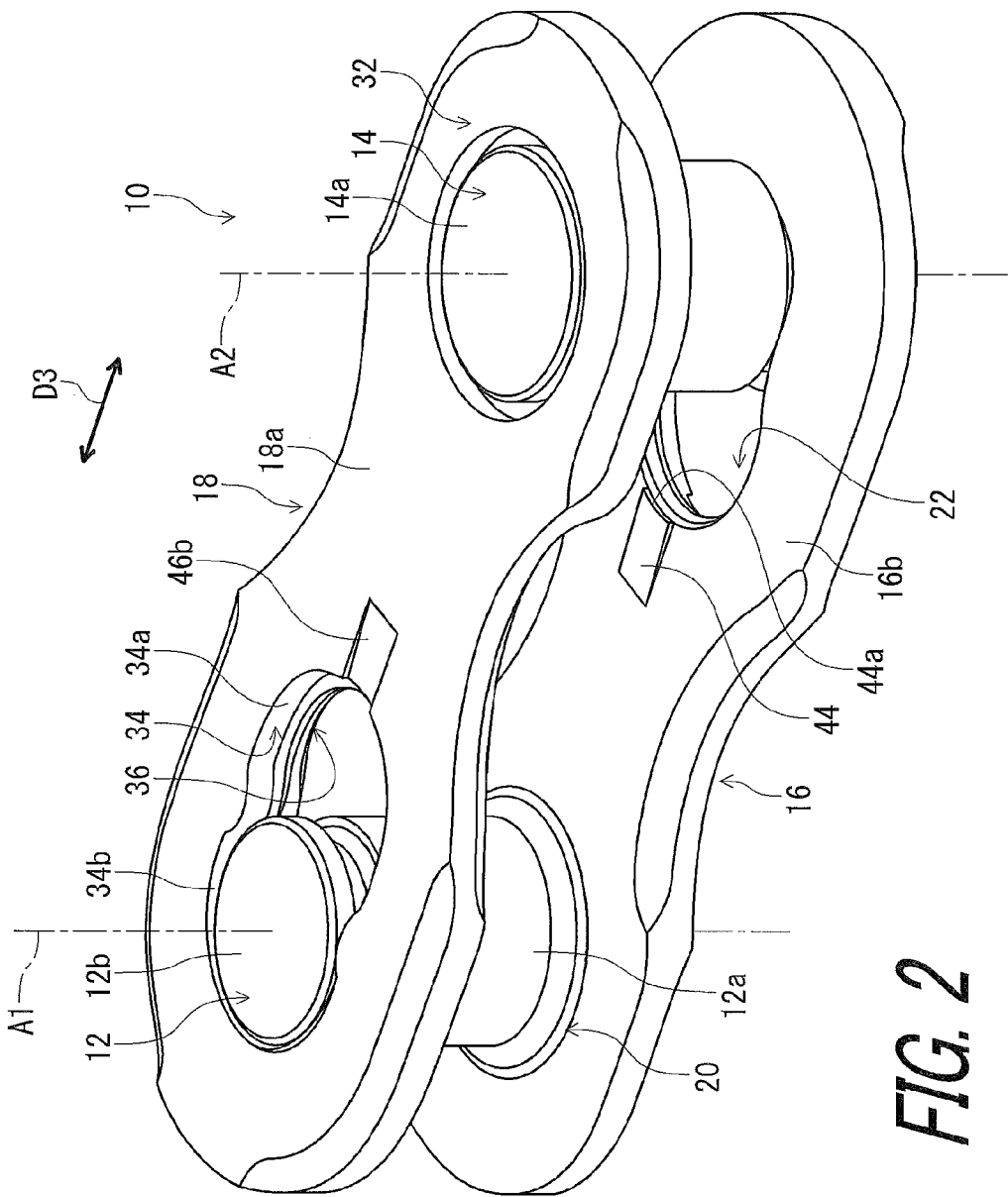
FIG. 2 is a perspective view of a bicycle chain connecting link illustrated in FIG. 1.

Referring initially to FIGS. 1 and 2, a bicycle chain connecting link 10 in accordance with a first embodiment is illustrated. The bicycle chain connecting link 10 comprises a first link pin or a link pin 12 (hereinafter referred to as the first link pin 12), a second link pin or a link pin 14 (hereinafter referred to as the second link pin 14), a first link plate or a link plate 16 (hereinafter referred to as the first link plate 16), and a second link plate or a link plate 18 (hereinafter referred to as the second link plate 18). The first link pin 12 is secured to the first link plate 16 and is removably attached to the second link plate 18. The second link pin 14 is secured to the second link plate 18 and is removably attached to the first link plate 16.

In the illustrated embodiment, the second link pin 14 has substantially the same shape as a shape of the first link pin 12, and the second link plate 18 has substantially the same shape as a shape of the first link plate 16. However, the second link pin 14 can have a shape different from a shape of the first link pin 12 if needed and/or desired, and the second link plate 18 can have a shape different from a shape of the first link plate 16 if needed and/or desired.

Figure 3:
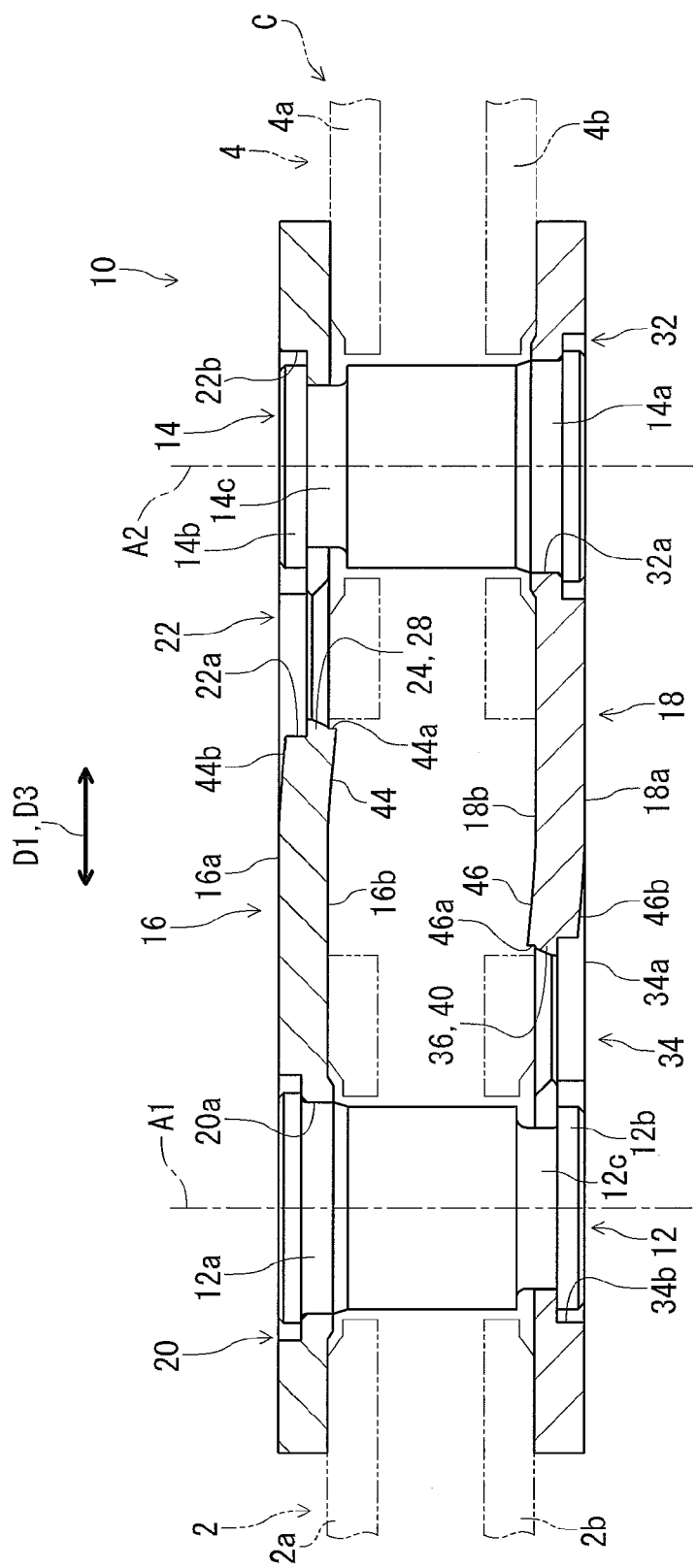
FIG. 3 is a cross-sectional view of the bicycle chain connecting link take along line III-III of FIG. 1.

As seen in FIG. 3, the bicycle chain connecting link 10 is configured to connect a first end 2 of a bicycle chain C to a second end 4 of the bicycle chain C. Inner link plates 2a and 2b provided at the first end 2 of the bicycle chain C is rotatably attached to the first link pin 12. Inner link plates 4a and 4b provided at the second end 4 of the bicycle chain C is rotatably attached to the second link pin 14.

Figure 4:
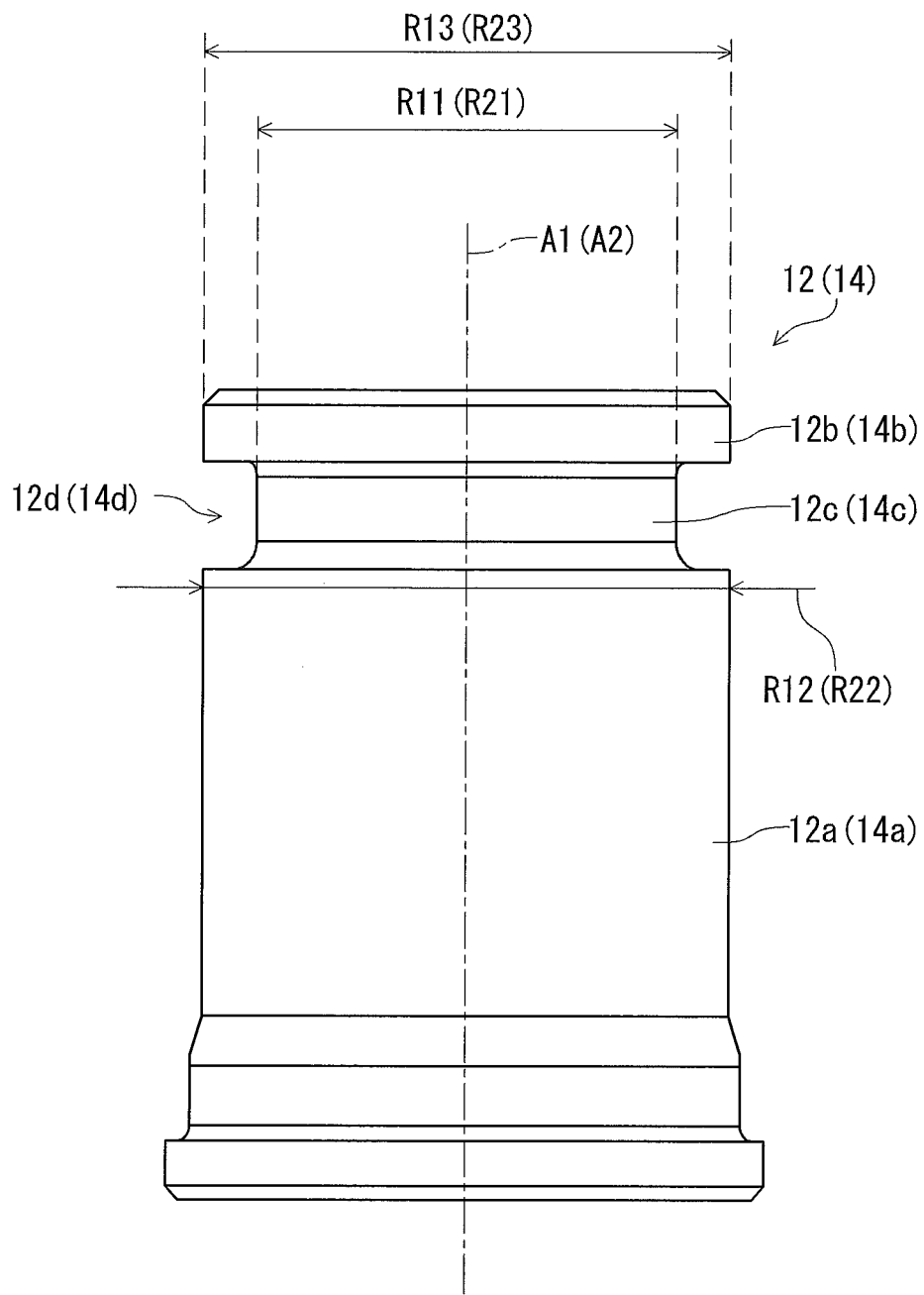
FIG. 4 is an elevational view of a link pin of the bicycle chain connecting link illustrated in FIG. 1.

As seen in FIG. 4, the first link pin 12 has a first center axis or a center axis A1 (hereinafter referred to as the first center axis A1). The first link pin 12 extends along the first center axis A1. The first link pin 12 comprises a first main-body or a main-body 12a (hereinafter referred to as the first main-body 12a), a first head portion or a head portion 12b (hereinafter referred to as the first head portion 12b), and a first intermediate portion or an intermediate portion 12c (hereinafter referred to as the first intermediate portion 12c). The first main-body 12a extends along the first center axis A1. The first head portion 12b is spaced apart from the first main-body 12a along the first center axis A1. The first intermediate portion 12c is provided between the first main-body 12a and the first head portion 12b and couples the first head portion 12b to the first main-body 12a. The first intermediate portion 12c has an outer diameter R11 smaller than an outer diameter R12 of the first main-body 12a and than an outer diameter R13 of the first head portion 12b to define a first groove or a groove 12d (hereinafter referred to as the first groove 12d) between the first main-body 12a and the first head portion 12b.

As seen in FIG. 4, the second link pin 14 has a second center axis A2. The second link pin 14 extends along the second center axis A2. The second link pin 14 comprises a second main-body 14a, a second head portion 14b, and a second intermediate portion 14c. The second main-body 14a extends along the second center axis A2. The second head portion 14b is spaced apart from the second main-body 14a along the second center axis A2. The second intermediate portion 14c is provided between the second main-body 14a and the second head portion 14b and couples the second head portion 14b to the second main-body 14a. The second intermediate portion 14c has an outer diameter R21 smaller than an outer diameter R22 of the second main-body 14a and than an outer diameter R23 of the second head portion 14b to define a second groove 14d between the second main-body 14a and the second head portion 14b.

Figure 5:
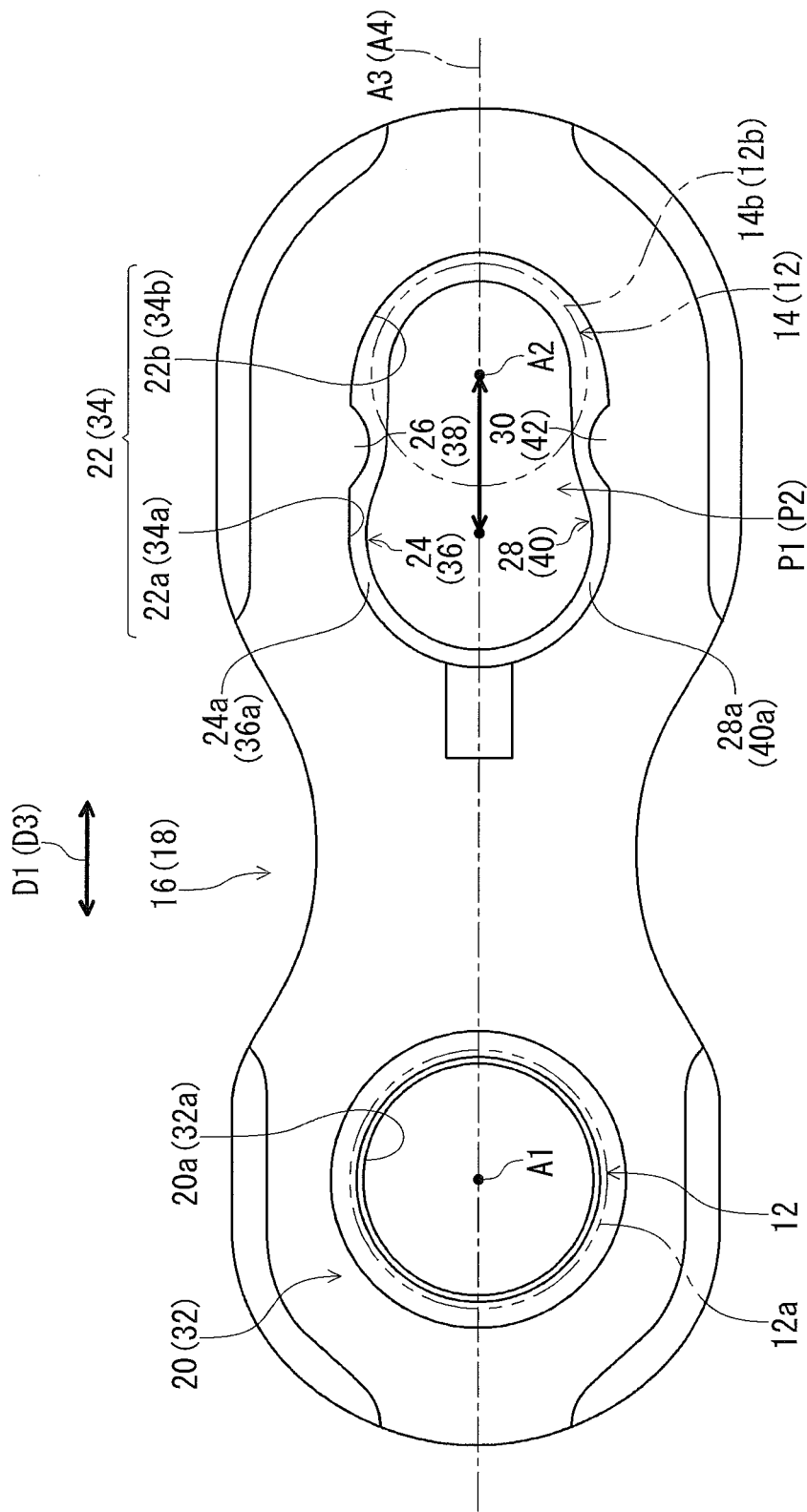
FIG. 5 is a plan view of a link plate of the bicycle chain connecting link illustrated in FIG. 1.

As seen in FIG. 5, the first link plate 16 comprises a first securing portion 20, a first elongated opening or an elongated opening 22 (hereinafter referred to as the first elongated opening 22), a first guiding portion or a guiding portion 24 (hereinafter referred to as the first guiding portion 24), and a first protrusion or a protrusion 26 (hereinafter referred to as the first protrusion 26). The first elongated opening 22 is spaced apart from the first securing portion 20 in a first longitudinal direction D1 of the first link plate 16. The first link plate 16 has a first longitudinal axis A3 and extends along the first longitudinal axis A3. The first longitudinal direction D1 is parallel to the first longitudinal axis A3. In the illustrated embodiment, the first link plate 16 has a symmetrical shape with respect to the first longitudinal axis A3. The first link plate 16 can, however, have an asymmetrical shape with respect to the first longitudinal axis A3 if needed and/or desired.

As seen in FIG. 3, the first main-body 12a of the first link pin 12 is secured to the first securing portion 20. As seen in FIGS. 3 and 5, the first securing portion 20 includes a first securing hole 20a to which the first main-body 12a of the first link pin 12 is secured. As seen in FIG. 3, for example, the first link pin 12 is press-fitted in the first securing hole 20a.

As seen in FIG. 5, the second link pin 14 is removably attached to the first elongated opening 22. More specifically, the first elongated opening 22 comprises a first insertion opening or an insertion opening 22a (hereinafter referred to as the first insertion opening 22a) and a first attachment opening or an attachment opening 22b (hereinafter referred to as the first attachment opening 22b) connected with the first insertion opening 22a. The second head portion 14b is to be inserted into the first insertion opening 22a when the second link pin 14 is attached to the first link plate 16. The second head portion 14b is at least partially disposed in the first attachment opening 22b in a state where the bicycle chain connecting link 10 is assembled.

As seen in FIG. 5, the first guiding portion 24 protrudes inwardly from an inner periphery of the first elongated opening 22. The first guiding portion 24 is configured to guide the second link pin 14 in the first longitudinal direction D1. The first protrusion 26 is provided between the first insertion opening 22a and the first attachment opening 22b.

Figure 6:
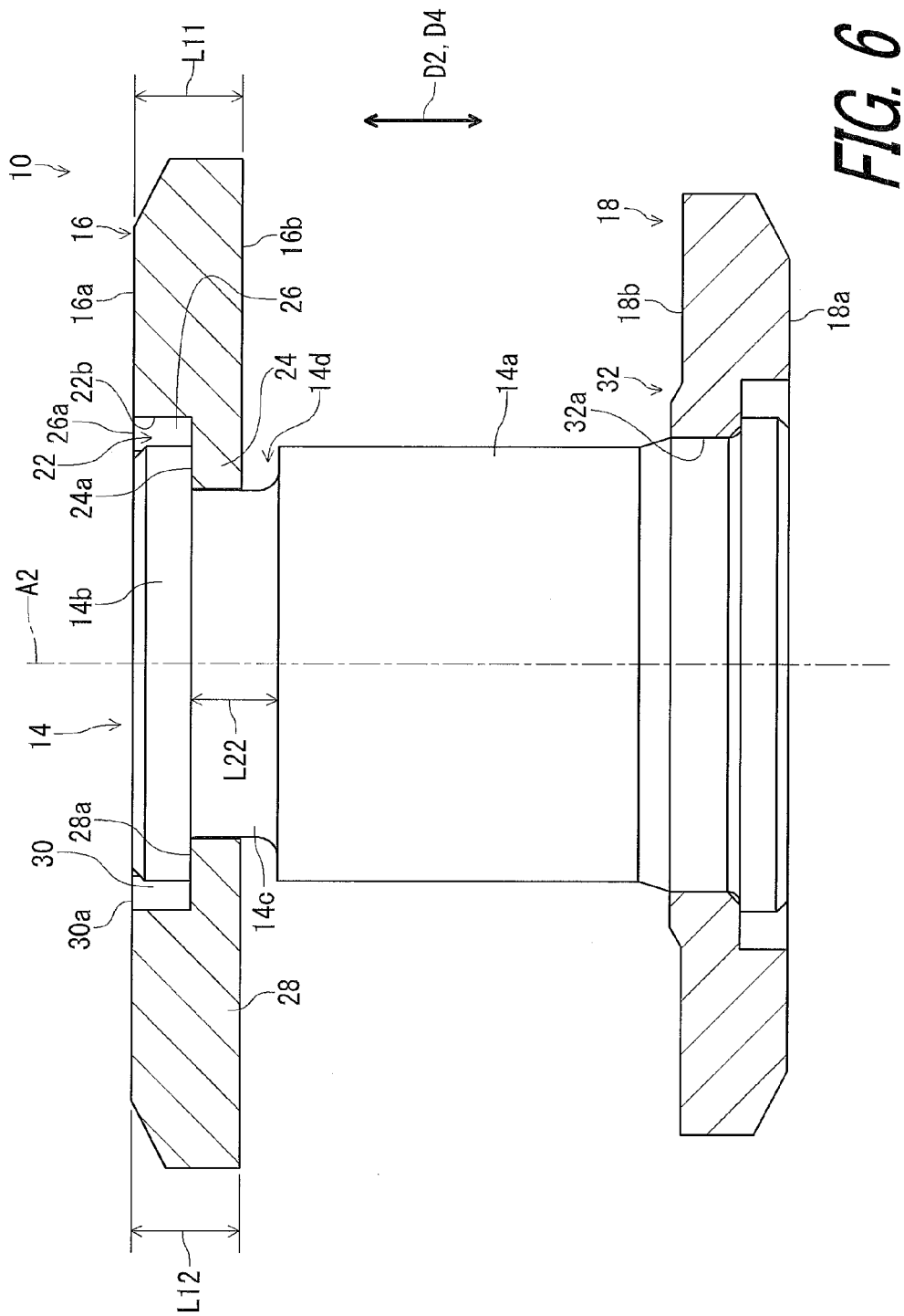
FIG. 6 is a cross-sectional view of the bicycle chain connecting link take along line VI-VI of FIG. 1.

As seen in FIGS. 5 and 6, the first guiding portion 24 is configured to engage with the second groove 14d of the second link pin 14 to guide the second link pin 14 between the first insertion opening 22a and the first attachment opening 22b. The first guiding portion 24 includes a first sliding surface or a sliding surface 24a (hereinafter referred to as the first sliding surface 24a) slidable with the second head portion 14b.

As seen in FIG. 6, the first protrusion 26 protrudes from the first sliding surface 24a to be slidable with an outer periphery of the second head portion 14b. The first protrusion 26 protrudes from the first sliding surface 24a in a first axial direction or an axial direction D2 (hereinafter referred to as the first axial direction D2) parallel to the first center axis A1 of the first link pin 12. The first protrusion 26 radially inwardly protrudes from the inner periphery of the first elongated opening 22.

As seen in FIG. 5, the first link plate 16 further comprises a first additional guiding portion or an additional guiding portion 28 (hereinafter referred to as the first additional guiding portion 28) and a first additional protrusion or an additional protrusion 30 (hereinafter referred to as the first additional protrusion 30). The first additional guiding portion 28 protrudes inwardly from an inner periphery of the first elongated opening 22. The first additional guiding portion 28 is configured to guide the second link pin 14 in the first longitudinal direction D1. The first additional protrusion 30 is provided between the first insertion opening 22a and the first attachment opening 22b.

As seen in FIGS. 5 and 6, the first additional guiding portion 28 is configured to engage with the second groove 14d of the second link pin 14 to guide the second link pin 14 between the first insertion opening 22a and the first attachment opening 22. The first additional guiding portion 28 includes a first additional sliding surface or an additional sliding surface 28a (hereinafter referred to as the first additional sliding surface 28a) slidable with the second head portion 14b.

As seen in FIG. 6, the first additional protrusion 30 protrudes from the first additional sliding surface 28a to be slidable with the outer periphery of the second head portion 14b. The first additional protrusion 30 protrudes from the first additional sliding surface 28a in the first axial direction D2. The first additional protrusion 30 radially inwardly protrudes from the inner periphery of the first elongated opening 22.

As seen in FIG. 5, the first additional guiding portion 28 is spaced apart from the first guiding portion 24 to define, between the first guiding portion 24 and the first additional guiding portion 28, a sliding passage P1 through which the second intermediate portion 14c of the second link pin 14 is to pass. In the illustrated embodiment, the first guiding portion 24 and the first additional guiding portion 28 form an annular protrusion provided along the inner periphery of the first elongated opening 22. However, the first guiding portion 24 can be a separate portion from the first additional guiding portion 28 if needed and/or desired.

As seen in FIG. 5, the second link plate 18 comprises a second securing portion 32 and a second elongated opening or an elongated opening 34 (hereinafter referred to as the second elongated opening 34). The second elongated opening 34 is spaced apart from the second securing portion 32 in a second longitudinal direction D3 of the second link plate 18. The second link plate 18 has a second longitudinal axis A4 and extends along the second longitudinal axis A4. The second longitudinal direction D3 is parallel to the second longitudinal axis A4. In the illustrated embodiment, the second link plate 18 has a symmetrical shape with respect to the second longitudinal axis A4. The second link plate 18 can, however, have an asymmetrical shape with respect to the second longitudinal axis A4 if needed and/or desired.

As seen in FIG. 3, the second main-body 14a of the second link pin 14 is secured to the second securing portion 32. As seen in FIGS. 3 and 5, the second securing portion 32 includes a second securing hole 32a to which the second main-body 14a of the second link pin 14 is secured. As seen in FIG. 3, for example, the second link pin 14 is press-fitted in the second securing hole 32a.

As seen in FIG. 5, the first link pin 12 is removably attached to the second elongated opening 34. More specifically, the second elongated opening 34 comprises a second insertion opening or an insertion opening 34a (hereinafter referred to as the second insertion opening 34a) and a second attachment opening or an attachment opening 34b (hereinafter referred to as the second attachment opening 34b) connected with the second insertion opening 34a. The first head portion 12b is to be inserted into the second insertion opening 34a when the first link pin 12 is attached to the second link plate 18. The first head portion 12b is at least partially disposed in the second attachment opening 34b in a state where the bicycle chain connecting link 10 is assembled.

As seen in FIG. 5, the second link plate 18 further comprises a second guiding portion 36 and a second protrusion 38. The second guiding portion 36 protrudes inwardly from an inner periphery of the second elongated opening 34. The second guiding portion 36 is configured to guide the first link pin 12 in the second longitudinal direction D3. The second protrusion 38 is provided between the second insertion opening 34a and the second attachment opening 34b.

Figure 7:
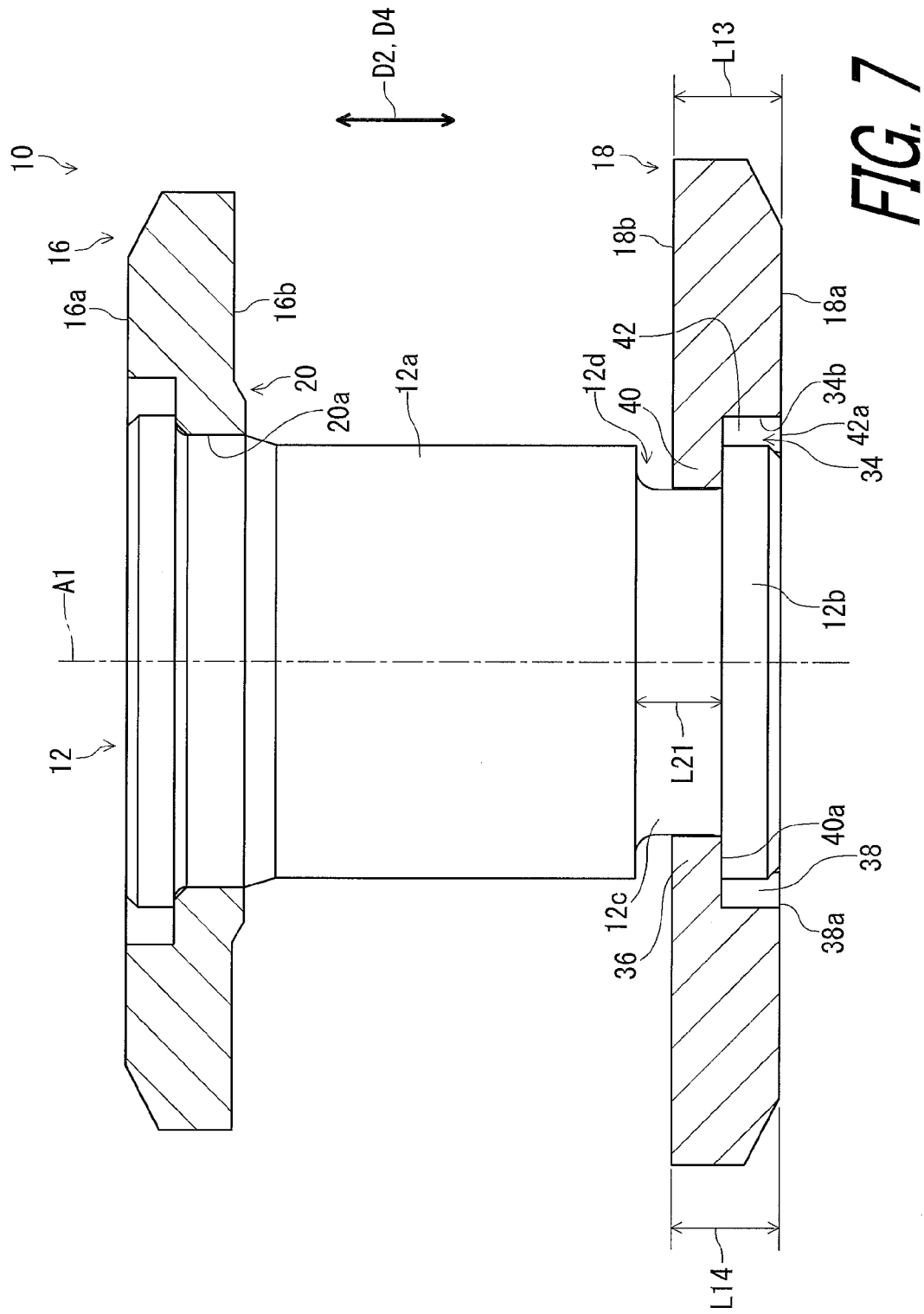
FIG. 7 is a cross-sectional view of the bicycle chain connecting link take along line VII-VII of FIG. 1.

As seen in FIGS. 5 and 7, the second guiding portion 36 is configured to engage with the first groove 12d of the first link pin 12 to guide the first link pin 12 between the second insertion opening 34a and the second attachment opening 34b. The second guiding portion 36 includes a second sliding surface or a sliding surface 36a (hereinafter referred to as the second sliding surface 36a) slidable with the first head portion 12b.

As seen in FIG. 7, the second protrusion 38 protrudes from the second sliding surface 36a to be slidable with an outer periphery of the first head portion 12b. The second protrusion 38 protrudes from the second sliding surface 36a in a second axial direction or an axial direction D4 (hereinafter referred to as the second axial direction D4) parallel to the second center axis A2 of the second link pin 14. The second axial direction D4 is parallel to the first axial direction D2 in a state where the bicycle chain connecting link 10 is assembled. The second protrusion 38 radially inwardly protrudes from the inner periphery of the second elongated opening 34.

As seen in FIG. 5, the second link plate 18 further comprises a second additional guiding portion or an additional guiding portion 40 (hereinafter referred to as the second additional guiding portion 40) and a second additional protrusion or an additional protrusion 42 (hereinafter referred to as the second additional protrusion 42). The second additional guiding portion 40 protrudes inwardly from an inner periphery of the second elongated opening 34. The second additional guiding portion 40 is configured to guide the first link pin 12 in the second longitudinal direction D3. The second additional protrusion 42 is provided between the second insertion opening 34a and the second attachment opening 34b.

As seen in FIGS. 5 and 7, the second additional guiding portion 40 is configured to engage with the first groove 12d of the first link pin 12 to guide the first link pin 12 between the second insertion opening 34a and the second attachment opening 34b. The second additional guiding portion 40 includes a second additional sliding surface or an additional sliding surface 40a (hereinafter referred to as the second additional sliding surface 40a) slidable with the first head portion 12b.

As seen in FIG. 7, the second additional protrusion 42 protrudes from the second additional sliding surface 40a to be slidable with the outer periphery of the first head portion 12b. The second additional protrusion 42 protrudes from the second additional sliding surface 40a in the second axial direction D4. The second additional protrusion 42 radially inwardly protrudes from the inner periphery of the second elongated opening 34.

As seen in FIG. 5, the second additional guiding portion 40 is spaced apart from the second guiding portion 36 to define, between the second guiding portion 36 and the second additional guiding portion 40, a sliding passage P2 through which the first intermediate portion 12c of the first link pin 12 is to pass. In the illustrated embodiment, the second guiding portion 36 and the second additional guiding portion 40 form an annular protrusion provided along the inner periphery of the second elongated opening 34. However, the second guiding portion 36 can be a separate portion from the second additional guiding portion 40 if needed and/or desired.

As seen in FIG. 7, the first link plate 16 further comprises a first outer surface 16a and a first inner surface 16b opposite to the first outer surface 16a in the first axial direction D2. The first inner surface 16b is closer to the first head portion 12b than the first outer surface 16a in the first axial direction D2.

Figure 8:
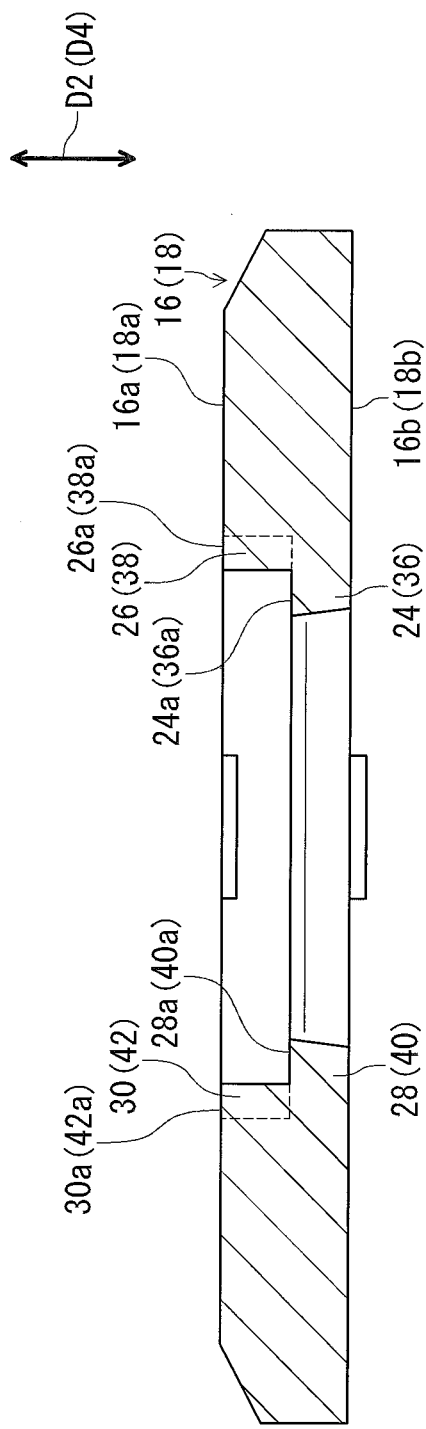
FIG. 8 is a cross-sectional view of the link plate take along line VIII-VIII of FIG. 1.

As seen in FIG. 8, the first protrusion 26 has a first surface 26a facing in the first axial direction D2 and disposed at a position same as the first outer surface 16a in the first axial direction D2. The first additional protrusion 30 has a first additional surface 30a facing in the first axial direction D2 and disposed at a position same as the first outer surface 16a in the first axial direction D2.

As seen in FIG. 6, the second link plate 18 further comprises a second outer surface 18a and a second inner surface 18b opposite to the second outer surface 18a in the second axial direction D4. The second inner surface 18b is closer to the second head portion 14b than the second outer surface 18a in the second axial direction D4.

As seen in FIG. 8, the second protrusion 38 has a second surface 38a facing in the second axial direction D4 and disposed at a position same as the second outer surface 18a in the second axial direction D4. The second additional protrusion 42 has a second additional surface 42a facing in the second axial direction D4 and disposed at a position same as the second outer surface 18a in the second axial direction D4.

As seen in FIG. 6, a first total length or a total length L11 (hereinafter referred to as the first total length L11) of the first guiding portion 24 and the first protrusion 26 is defined in the first axial direction D2 parallel to the first center axis A1. The first total length L11 is longer than a second minimum axial distance or a minimum axial distance L22 (hereinafter referred to as the second minimum axial distance L22) defined between the second head portion 14b and the second main-body 14a in the second axial direction D4 parallel to the second center axis A2. This prevents the first protrusion 26 from entering the second groove 14d. In the illustrated embodiment, the first total length L11 is defined from the first surface 26a to the first inner surface 16b in the first axial direction D2. The first total length L11 can be less than the second minimum axial distance L22 if needed and/or desired.

A second total length or a total length L12 (hereinafter referred to as the second total length L12) of the first additional guiding portion 28 and the first additional protrusion 30 is defined in the first axial direction D2. The second total length L12 is longer than the second minimum axial distance L22 defined between the second head portion 14b and the second main-body 14a in the second axial direction D4. This prevents the first additional protrusion 30 from entering the second groove 14d. In the illustrated embodiment, the second total length L12 is defined from the first additional surface 30a to the first inner surface 16b in the first axial direction D2. The second total length L12 can be less than the second minimum axial distance L22 if needed and/or desired.

As seen in FIG. 7, a third total length or a total length L13 (hereinafter referred to as the third total length L13) of the second guiding portion 36 and the second protrusion 38 is defined in the second axial direction D4. The third total length L13 is longer than a first minimum axial distance or a minimum axial distance L21 (hereinafter referred to as the first minimum axial distance L21) defined between the first head portion 12b and the first main-body 12a in the first axial direction D2. This prevents the second protrusion 38 from entering the first groove 12d. In the illustrated embodiment, the third total length L13 is defined from the second surface 38a to the second inner surface 18b in the second axial direction D4. The third total length L13 can be less than the first minimum axial distance L21 if needed and/or desired.

A fourth total length or a total length L14 (hereinafter referred to as the fourth total length L14) of the second additional guiding portion 40 and the second additional protrusion 42 is defined in the second axial direction D4. The fourth total length L14 is longer than the first minimum axial distance L21 defined between the first head portion 12b and the first main-body 12a in the first axial direction D2. This prevents the second additional protrusion 42 from entering the first groove 12d. In the illustrated embodiment, the fourth total length L142 is defined from the second additional surface 42a to the second inner surface 18b in the second axial direction D4. The fourth total length L14 can be less than the first minimum axial distance L21 if needed and/or desired.

Figure 9:
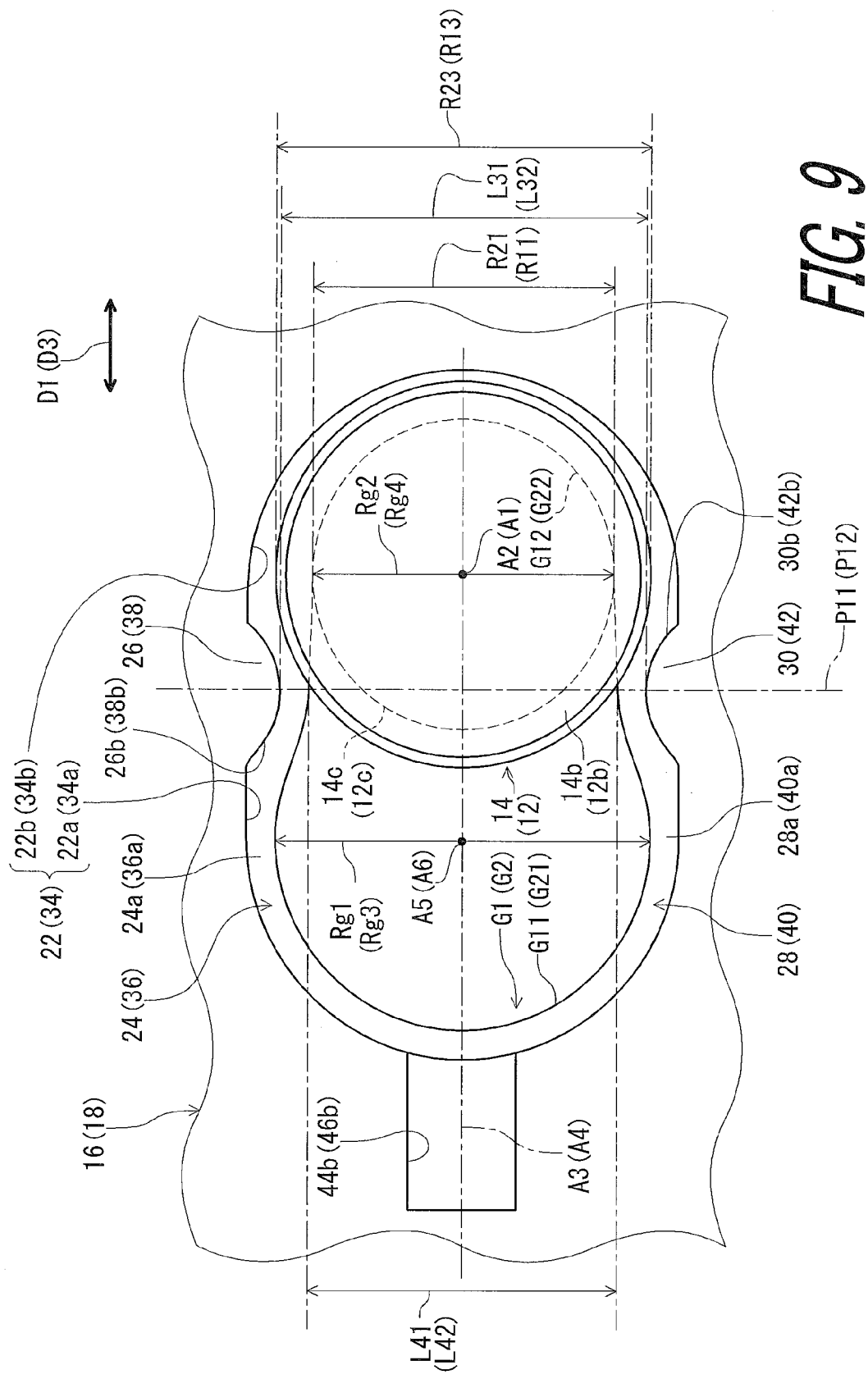
FIG. 9 is a partial plan view of the bicycle chain connecting link illustrated in FIG. 1.

As seen in FIG. 9, the first protrusion 26 includes a first curved sliding surface 26b slidable with the outer periphery of the second head portion 14b. The first additional protrusion 30 includes a first curved additional sliding surface 30b slidable with the outer periphery of the second head portion 14b. The first additional protrusion 30 is spaced apart from the first protrusion 26 to define a first minimum distance or a minimum distance L31 (hereinafter referred to as the first minimum distance L31) between the first protrusion 26 and the first additional protrusion 30. The first minimum distance L31 is shorter than the outer diameter R23 of the second head portion 14b. This increases sliding resistance between the first link plate 16 and the second head portion 14b when the second head portion 14b moves between the first insertion opening 22a and the first attachment opening 22b, and fixes the second head portion 14b in the first attachment opening 22b such that the second head portion 14b does not easily move in the first longitudinal direction D1 after being positioned in the first attachment opening 22b.

The first additional guiding portion 28 is spaced apart from the first guiding portion 24 to define a first sliding-passage width or a sliding-passage width L41 (hereinafter referred to as the first sliding-passage width L41) between the first guiding portion 24 and the first additional guiding portion 28. The first minimum distance L31 is longer than the first sliding-passage width L41 defined at a position P11 at which the first minimum distance L31 is defined when viewed from the first axial direction D2. The first minimum distance L31 can, however, be equal to the first sliding-passage width L41 if needed and/or desired.

As seen in FIG. 9, the second protrusion 38 includes a second curved sliding surface 38b slidable with the outer periphery of the first head portion 12b. The second additional protrusion 42 includes a second curved additional sliding surface 42b slidable with the outer periphery of the first head portion 12b. The second additional protrusion 42 is spaced apart from the second protrusion 38 to define a second minimum distance or a minimum distance L32 (hereinafter referred to as the second minimum distance L32) between the second protrusion 38 and the second additional protrusion 42. The second minimum distance L32 is shorter than the outer diameter R13 of the first head portion 12b. This increases sliding resistance between the second link plate 18 and the first head portion 12b when the first head portion 12b moves between the second insertion opening 34a and the second attachment opening 34b, and fixes the first head portion 12b in the second attachment opening 34b such that the first head portion 12b does not easily move in the second longitudinal direction D3 after being positioned in the second attachment opening 34b.

The second additional guiding portion 40 is spaced apart from the second guiding portion 36 to define a second sliding-passage width or a sliding-passage width L42 (hereinafter referred to as the second sliding-passage width L42) between the second guiding portion 36 and the second additional guiding portion 40. The second minimum distance L32 is longer than the second sliding-passage width L42 defined at a position P12 at which the second minimum distance L32 is defined when viewed from the second axial direction D4. The second minimum distance L32 can, however, be equal to the second sliding-passage width L42 if needed and/or desired.

As seen in FIG. 9, the first guiding portion 24 and the first additional guiding portion 28 define a first guide opening G1. The first guide opening G1 extends along the first longitudinal axis A3 and is disposed in the first elongated opening 22. The first guide opening G1 includes a first insertion section G11 and a first attachment section G12. The second head portion 14b is inserted into the first insertion section G11 when the second link pin 14 is attached to the first link plate 16. The second intermediate portion 14c is disposed in the first attachment section G12 in a state where the second link pin 14 is attached to the first link plate 16.

The first insertion section G11 is disposed in the first insertion opening 22a and has a first inner diameter Rg1. The first attachment section G12 is disposed in the first attachment opening 22b and has a second inner diameter Rg2. The first inner diameter Rg1 is equal to or larger than the outer diameter R23 of the second head portion 14b. The second inner diameter Rg2 is equal to or larger than the outer diameter R21 of the second intermediate portion 14c and smaller than the outer diameter R23 of the second head portion 14b.

Similarly, the second guiding portion 36 and the second additional guiding portion 40 define a second guide opening G2. The second guide opening G2 extends along the second longitudinal axis A4 and is disposed in the second elongated opening 34. The second guide opening G2 includes a second insertion section G21 and a second attachment section G22. The first head portion 12b is inserted into the second insertion section G21 when the first link pin 12 is attached to the second link plate 18. The first intermediate portion 12c is disposed in the second attachment section G22 in a state where the first link pin 12 is attached to the second link plate 18.

The second insertion section G21 is disposed in the second insertion opening 34a and has a third inner diameter Rg3. The second attachment section G22 is disposed in the second attachment opening 34b and has a fourth inner diameter Rg4. The third inner diameter Rg3 is equal to or larger than the outer diameter R13 of the first head portion 12b. The fourth inner diameter Rg4 is equal to or larger than the outer diameter R11 of the first intermediate portion 12c, and smaller than the outer diameter R13 of the first head portion 12b.

Figure 10:
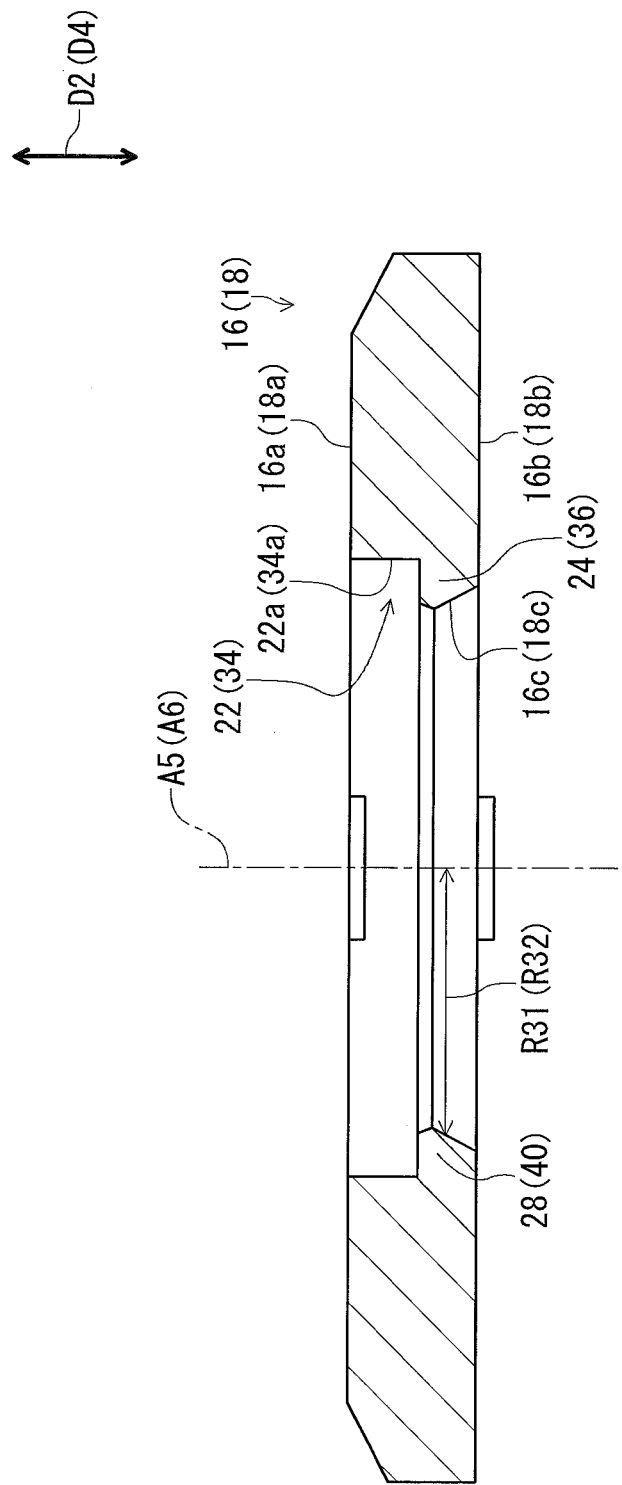
FIG. 10 is a cross-sectional view of the link plate take along line X-X of FIG. 1.

As seen in FIG. 10, the first link plate 16 may further comprise a first tapered surface or a tapered surface 16c (hereinafter referred to as the first tapered surface 16c) inclined with respect to the first axial direction D2 to guide the second head portion 14b into the first insertion opening 22a. An inner radius R31 defined by the first tapered surface 16c gradually decreases from the first inner surface 16b toward the first outer surface 16a. The inner radius R31 is defined based on a center line A5 of the first insertion opening 22a. In the illustrated embodiment, the first tapered surface 16c is provided on the first guiding portion 24 and the first additional guiding portion 28.

The second link plate 18 further comprises a second tapered surface or a tapered surface 18c (hereinafter referred to as the second tapered surface 18c) inclined with respect to the second axial direction D4 to guide the first head portion 12b (an additional head portion of an additional link pin) into the second insertion opening 34a. An inner radius R32 defined by the second tapered surface 18c gradually decreases from the second inner surface 18b toward the second outer surface 18a. The inner radius R32 is defined based on a center line A6 of the second insertion opening 34a. In the illustrated embodiment, the second tapered surface 18c is provided on the second guiding portion 36 and the second additional guiding portion 40.

Figure 11:
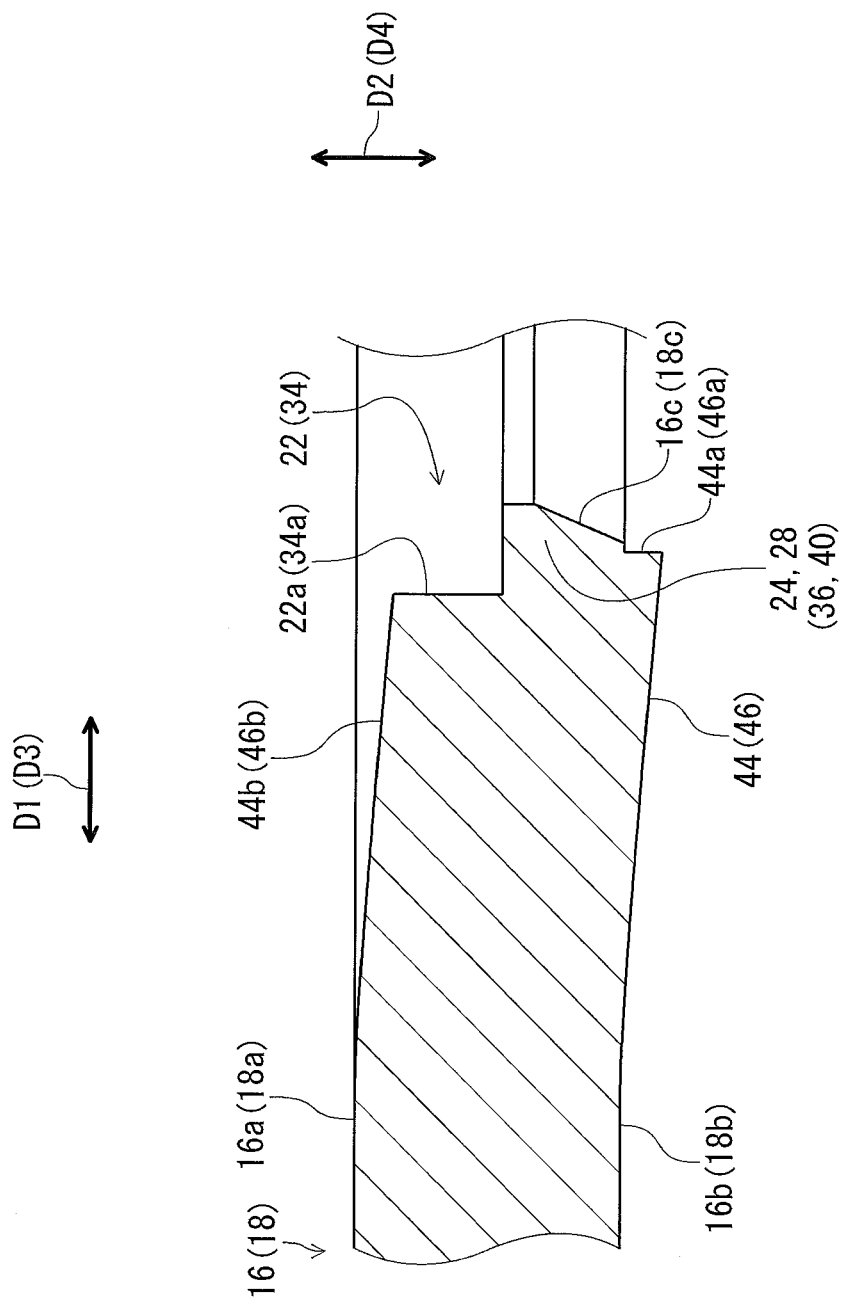
FIG. 11 is a partial enlarged cross-sectional view of the link plate of the bicycle chain connecting link illustrated in FIG. 1.

As seen in FIGS. 2, 3 and 11, the first link plate 16 includes a first stopper 44 protruding from the first inner surface 16b and provided between the first securing portion 20 and the first elongated opening 22. As seen in FIG. 3, the first stopper 44 includes a first restricting surface 44a to restrict a relative movement between the first link plate 16 and the inner link plate 4a in the first longitudinal direction D1. For example, the first stopper 44 is provided by one of punching and cutting. In the illustrated embodiment, the first stopper 44 is provided by punching.

As seen in FIG. 11, the first stopper 44 is formed so that an inner periphery of the first insertion opening 22a is at least partially raised. The first restricting surface 44a extends from the first tapered surface 16c in the first axial direction D2. As seen in FIGS. 1 and 11, a first recess 44b is provided on the first outer surface 16a. The first recess 44b is disposed on the inner periphery of the first insertion opening 22a.

As seen in FIGS. 1, 3 and 11, the second link plate 18 includes a second stopper 46 protruding from the second inner surface 18b and provided between the second securing portion 32 and the second elongated opening 34. As seen in FIG. 3, the second stopper 46 includes a second restricting surface 46a to restrict a relative movement between the second link plate 18 and the inner link plate 2b in the second longitudinal direction D3. For example, the second stopper 46 is provided by one of punching and cutting. In the illustrated embodiment, the second stopper 46 is provided by the punching.

As seen in FIG. 11, the second stopper 46 is formed so that an inner periphery of the second insertion opening 34a is at least partially raised. The second restricting surface 46a extends from the second tapered surface 18c in the second axial direction D4. As seen in FIGS. 2 and 11, a second recess 46b is provided on the second outer surface 18a. The second recess 46b is disposed on the inner periphery of the second insertion opening 34a.

Figure 12:
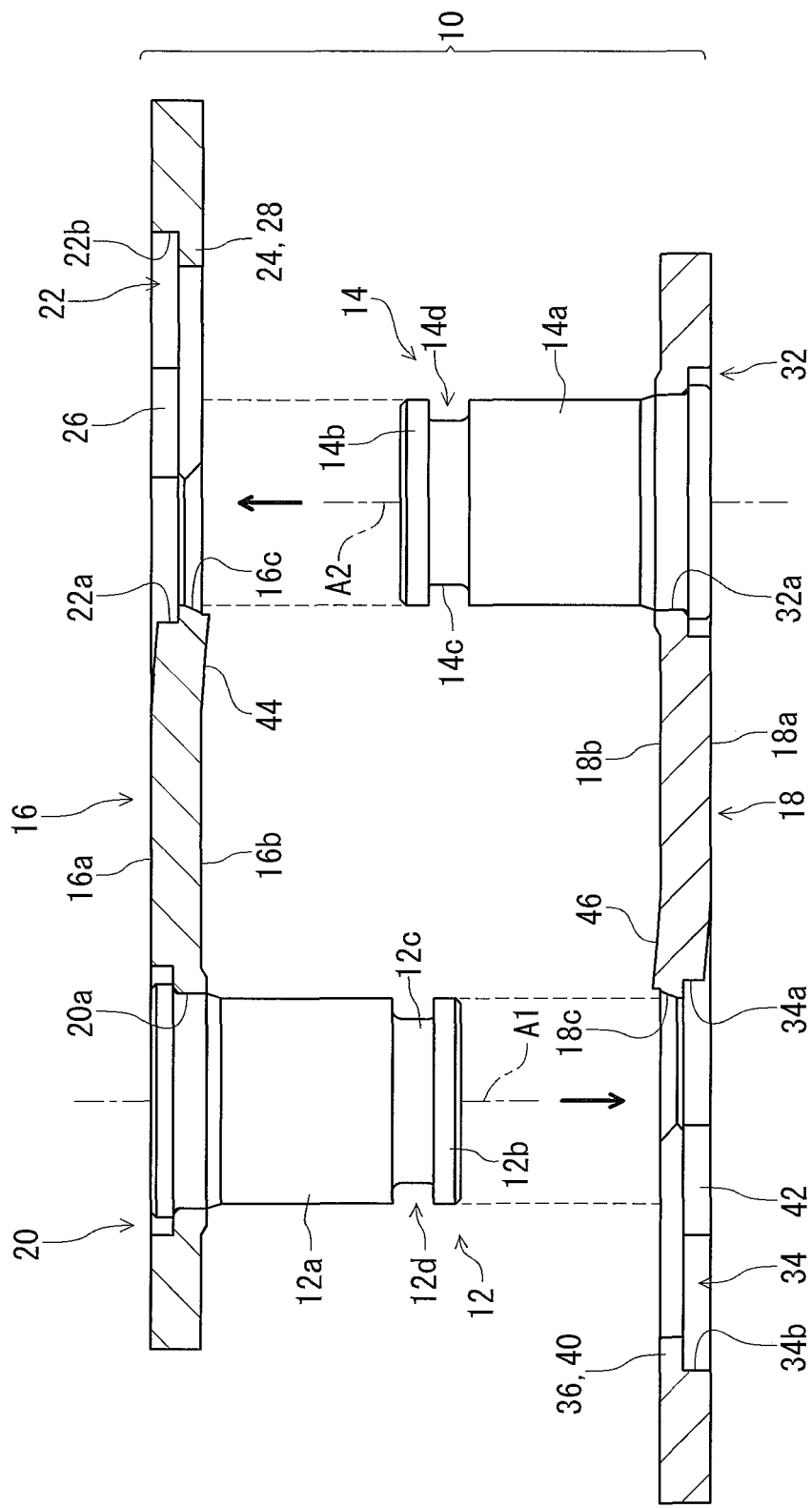
FIG. 12 is a cross-sectional view of the bicycle chain connecting link for explaining a method of assembling the bicycle chain connecting link illustrated in FIG. 1.

As seen in FIG. 12, when the bicycle chain connecting link 10 is assembled, the second head portion 14b of the second link pin 14 is inserted into the first elongated opening 22, and the first head portion 12b of the first link pin 12 is inserted into the second elongated opening 34. More specifically, the second head portion 14b is inserted into the first insertion opening 22a, and the first head portion 12b is inserted into the second insertion opening 34a.

Figure 13:
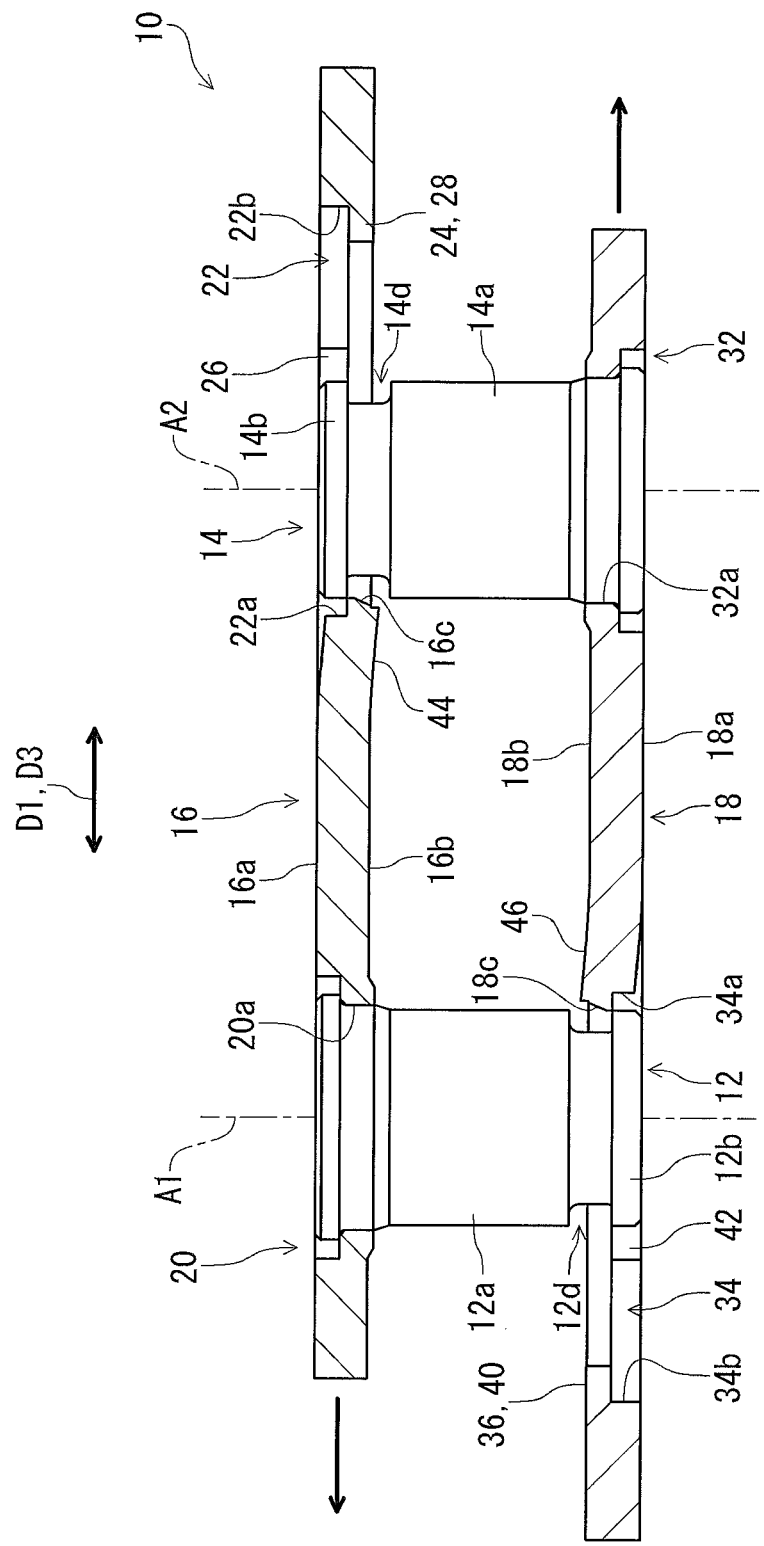
FIG. 13 is a cross-sectional view of the bicycle chain connecting link for explaining the method of assembling the bicycle chain connecting link illustrated in FIG. 1.

As seen in FIG. 13, the first link plate 16 and the second link plate 18 are relatively moved in the first longitudinal direction D1 (the second longitudinal direction D3). At this time, the first guiding portion 24 and the first additional guiding portion 28 are inserted into the second groove 14d, and the second guiding portion 36 and the second additional guiding portion 40 are inserted into the first groove 12d.

Figure 14:
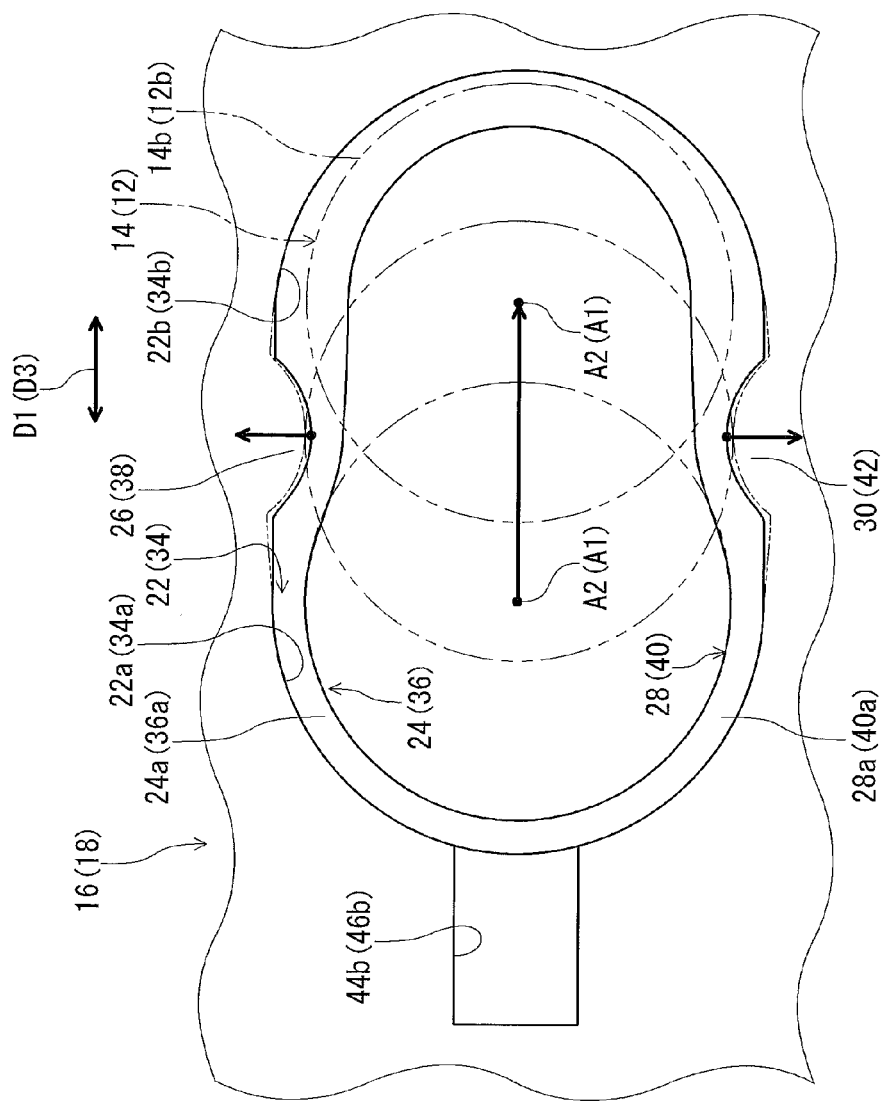
FIG. 14 is a partial plan view of the bicycle chain connecting link for explaining the method of assembling the bicycle chain connecting link illustrated in FIG. 1.

As seen in FIG. 14, the outer periphery of the second head portion 14b slides with the first protrusion 26 and the first additional protrusion 30 when the second head portion 14b is moved from the first insertion opening 22a to the first attachment opening 22b. The first protrusion 26 and the first additional protrusion 30 increase sliding resistance when the second head portion 14b passes between the first protrusion 26 and the first additional protrusion 30. In a state where the second head portion 14b is disposed in the first attachment opening 22b, the first guiding portion 24 and the first additional guiding portion 28 prevent the second link pin 14 from being removed from the first attachment opening 22b. The first protrusion 26 and the first additional protrusion 30 restrict the second head portion 14b from moving from the first attachment opening 22b to the first insertion opening 22a.

Similarly, the outer periphery of the first head portion 12b slides with the second protrusion 38 and the second additional protrusion 42 when the first head portion 12b is moved from the second insertion opening 34a to the second attachment opening 34b. The second protrusion 38 and the second additional protrusion 42 increase sliding resistance when the first head portion 12b passes between the second protrusion 38 and the second additional protrusion 42. In a state where the first head portion 12b is disposed in the second attachment opening 34b, the second guiding portion 36 and the second additional guiding portion 40 prevent the first link pin 12 from being removed from the second attachment opening 34b. The second protrusion 38 and the second additional protrusion 42 restrict the first head portion 12b from moving from the second attachment opening 34b to the second insertion opening 34a.

With the bicycle chain connecting link 10, since the first protrusion 26 protrudes from the first sliding surface 24a to be slidable with an outer periphery of the second head portion 14b of the second link pin 14, the second head portion 14b can be held in the first attachment opening 22b of the first elongated opening 22 with a simple structure. Further, since the first protrusion 26 is slidable with the second head portion 14b of the second link pin 14 in a press-fitted manner and is not slidable with the second intermediate portion 14c of the second link pin 14 in a press-fitted manner, the outer diameter of the second intermediate portion 14c of the second link pin 14 can be designed to be larger than conventional structures in which such a protrusion is slidable with an intermediate portion of a link pin in a press-fitted manner. Therefore, it is possible to design the bicycle chain connecting link 10 to be more robust than such conventional connecting links.

Similarly, with the bicycle chain connecting link 10, since the first additional protrusion 30 protrudes from the first additional sliding surface 28a to be slidable with an outer periphery of the second head portion 14b of the second link pin 14, the second head portion 14b can be held in the first attachment opening 22b of the first elongated opening 22 with a simple structure. Further, since the first additional protrusion 30 is slidable with the second head portion 14b of the second link pin 14 in a press-fitted manner and is not slidable with the second intermediate portion 14c of the second link pin 14 in a press-fitted manner, the outer diameter of the second intermediate portion 14c of the second link pin 14 can be designed to be larger than conventional structures in which such a protrusion is slidable with an intermediate portion of a link pin in a press-fitted manner. Therefore, it is possible to design the bicycle chain connecting link 10 to be more robust than such conventional connecting links.

Similarly, since the second protrusion 38 protrudes from the second sliding surface 36a to be slidable with an outer periphery of the first head portion 12b of the first link pin 12, the first head portion 12b can be held in the second attachment opening 34b of the second elongated opening 34 with a simple structure. Further, since the second protrusion 38 is slidable with the first head portion 12b of the first link pin 12 in a press-fitted manner and is not slidable with the first intermediate portion 12c of the first link pin 12 in a press-fitted manner, the outer diameter of the first intermediate portion 12c of the first link pin 12 can be designed to be larger than conventional structures in which such a protrusion is slidable with an intermediate portion of a link pin in a press-fitted manner. Therefore, it is possible to design the bicycle chain connecting link 10 to be more robust than such conventional connecting links.

Similarly, since the second additional protrusion 42 protrudes from the second additional sliding surface 40a to be slidable with an outer periphery of the first head portion 12b of the first link pin 12, the first head portion 12b can be held in the second attachment opening 34b of the second elongated opening 34 with a simple structure. Further, since the second additional protrusion 42 is slidable with the first head portion 12b of the first link pin 12 in a press-fitted manner and is not slidable with the first intermediate portion 12c of the first link pin 12 in a press-fitted manner, the outer diameter of the first intermediate portion 12c of the first link pin 12 can be designed to be larger than conventional structures in which such a protrusion is slidable with an intermediate portion of a link pin in a press-fitted manner. Therefore, it is possible to design the bicycle chain connecting link 10 to be more robust than such conventional connecting links.

With the bicycle chain connecting link 10, the first tapered surface 16c is inclined with respect to the first axial direction D2 to guide the second head portion 14b into the first insertion opening 22a. This allows the second head portion 14b of the second link pin 14 to be easily inserted into the first insertion opening 22a of the first elongated opening 22.

Similarly, the second tapered surface 18c is inclined with respect to the second axial direction D4 to guide the first head portion 12b into the second insertion opening 34a. This allows the first head portion 12b of the first link pin 12 to be easily inserted into the second insertion opening 34a of the second elongated opening 34.

In the bicycle chain connecting link 10, the first link pin 12 is secured to the first link plate 16. The first link pin 12 can, however, be secured to the second link plate 18. In such embodiment, for example, the first link plate 16 includes the second elongated opening 34 instead of the first securing portion 20, and the second link plate 18 includes the first securing portion 20 instead of the second elongated opening 34.

Second Embodiment

A bicycle chain connecting link 210 in accordance with a second embodiment will be described below referring to FIG. 15. The bicycle chain connecting link 210 has substantially the same configuration as the bicycle chain connecting link 10 except for the protrusion. Thus, elements having substantially the same function as those in the first embodiment will be numbered the same here, and will not be described again in detail here for the sake of brevity.

Figure 15:
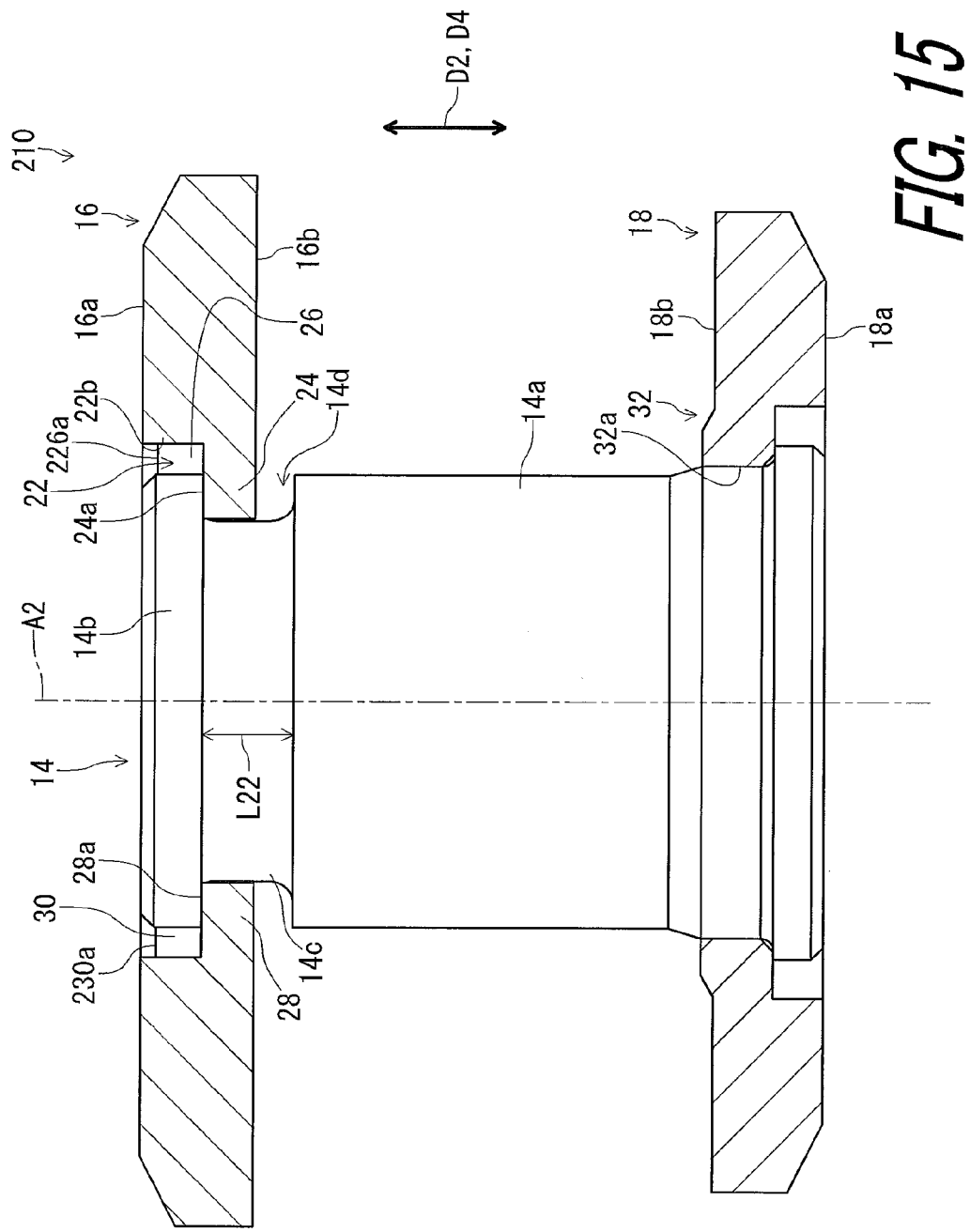
FIG. 15 is a cross-sectional view of a bicycle chain connecting link in accordance with a second embodiment.

As seen in FIG. 15, in the bicycle chain connecting link 210, the first protrusion 26 has a first surface 226a facing in the first axial direction D2. The first surface 226a is disposed at a position different from the first outer surface 16a in the first axial direction D2. In the illustrated embodiment, the first surface 226a is recessed from the first outer surface 16a toward the first sliding surface 24a.

Similarly, the first additional protrusion 30 has a first additional surface 230a facing in the first axial direction D2. The first additional surface 230a is disposed at a position different from the first outer surface 16a in the first axial direction D2. In the illustrated embodiment, the first additional surface 230a is recessed from the first outer surface 16a toward the first additional sliding surface 28a.

With the bicycle chain connecting link 210, since the first protrusion 26 protrudes from the first sliding surface 24a, and/or the first additional protrusion 30 protrudes from the first additional sliding surface 28a, to be slidable with an outer periphery of the second head portion 14b of the second link pin 14, the second head portion 14b can be held in the first attachment opening 22b of the first elongated opening 22 with a simple structure. Further, since the first and first additional protrusions 26, 30 are slidable with the second head portion 14b of the second link pin 14 in a press-fitted manner and are not slidable with the second intermediate portion 14c of the second link pin 14 in a press-fitted manner, the outer diameter of the second intermediate portion 14c of the second link pin 14 can be designed to be larger than conventional structures in which such a protrusion is slidable with an intermediate portion of a link pin in a press-fitted manner. Therefore, it is possible to design the bicycle chain connecting link 210 to be more robust than such conventional connecting links.

In the illustrated embodiment, axial positions of the first surface 226a and the first additional surface 230a is the same as each other in the first axial direction D2. However, the axial positions of the first surface 226a and the first additional surface 230a can be different from each other in the first axial direction D2.

The positional relationship between the first surface 226a and the first outer surface 16a can be applied to at least one of the second protrusion 38 and the second additional protrusion 42 if needed and/or desired.

Third Embodiment

A bicycle chain connecting link 310 in accordance with a third embodiment will be described below referring to FIG. 16. The bicycle chain connecting link 310 has substantially the same configuration as the bicycle chain connecting link 10 except for the stopper. Thus, elements having substantially the same function as those in the first embodiment will be numbered the same here, and will not be described again in detail here for the sake of brevity.

Figure 16:
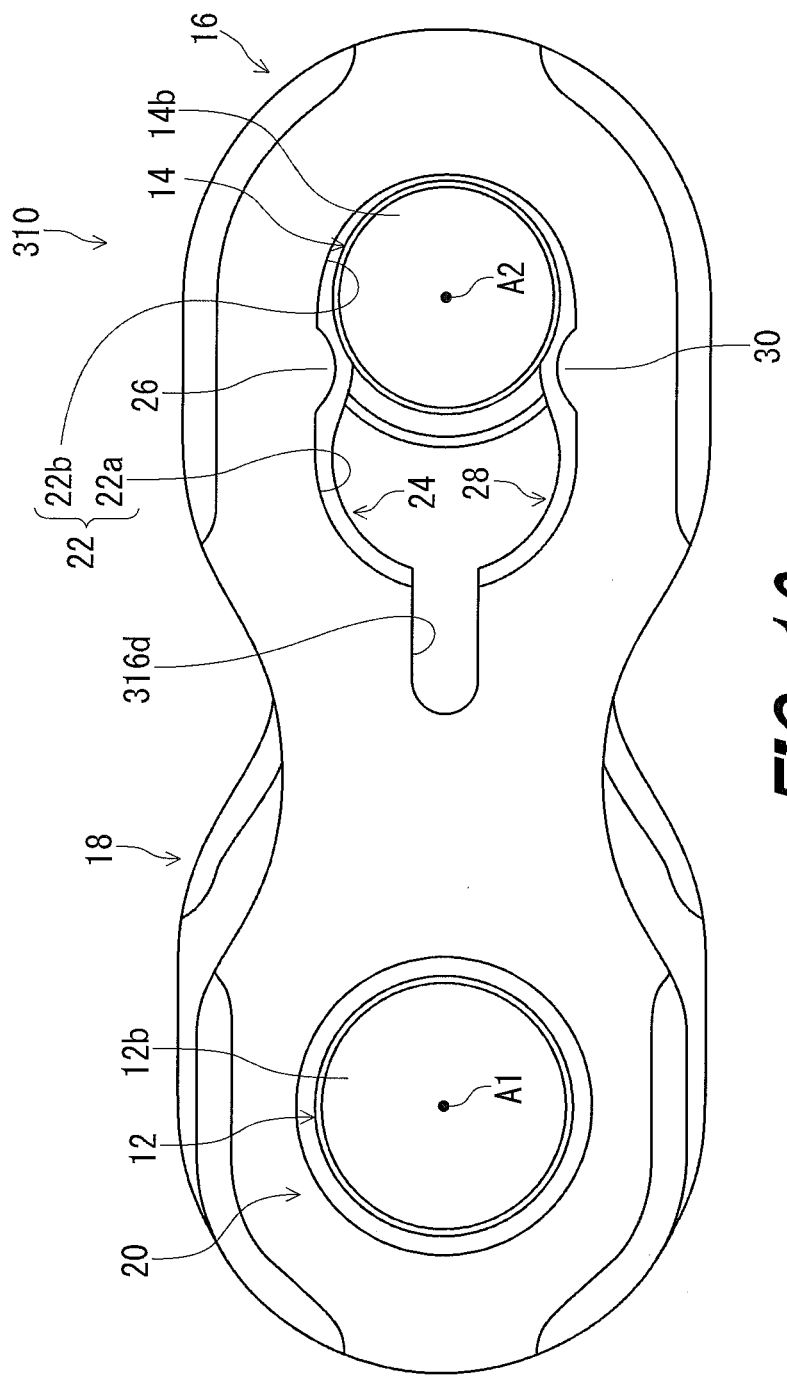
FIG. 16 is a plan view of a bicycle chain connecting link in accordance with a third embodiment.

As seen in FIG. 16, in the bicycle chain connecting link 310, the first link plate 16 includes a first cutout 316d provided on an inner periphery of the first elongated opening 22. The first cutout 316d is disposed between the first securing portion 20 and the first elongated opening 22. The first cutout 316d is provided by one of punching and cutting. The first guiding portion 24 and the first additional guiding portion 28 are partially separate from each other by the first cutout 316d. In the illustrated embodiment, the first stopper 44 is omitted from the first link plate 16. The first cutout 316d reduces weight of the bicycle chain connecting link 310, and allows the first elongated opening 22 to elastically expand such that the second head portion 14b of the second link pin 14 smoothly slides from the first insertion opening 22a to the first attachment opening 22b. The first cutout 316d can be applied to the second link plate 18.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle chain connecting link comprising:
a link pin having a center axis and comprising:
    a main-body extending along the center axis;
    a head portion spaced apart from the main-body along the center axis; and
    an intermediate portion provided between the main-body and the head portion and coupling the head portion to the main-body, the intermediate portion having an outer diameter smaller than an outer diameter of the main-body and than an outer diameter of the head portion to define a groove between the main-body and the head portion;
a link plate comprising:
    an elongated opening to which the link pin is removably attached, the elongated opening comprising:
        an insertion opening; and
        an attachment opening connected with the insertion opening;
    a guiding portion protruding inwardly from an inner periphery of the elongated opening and configured to engage with the groove of the link pin to guide the link pin between the insertion opening and the attachment opening, the guiding portion including a sliding surface slidable with the head portion; and
    a protrusion provided between the insertion opening and the attachment opening and protruding from the sliding surface to be slidable with an outer circumferential periphery of the head portion, the protrusion having a convex shape to increase sliding resistance when the outer circumferential periphery of the head portion moves between the insertion opening and the attachment opening.

2. The bicycle chain connecting link according to claim 1, wherein
a total length of the guiding portion and the protrusion is defined in an axial direction parallel to the center axis, and
the total length of the guiding portion and the protrusion is longer than a minimum axial distance defined between the head portion and the main-body in the axial direction parallel to the center axis.

3. The bicycle chain connecting link according to claim 2, wherein
the link plate further comprises
    an additional guiding portion protruding inwardly from the inner periphery of the elongated opening and configured to engage with the groove of the link pin to guide the link pin between the insertion opening and the attachment opening, the additional guiding portion including an additional sliding surface slidable with the head portion, and
    an additional protrusion provided between the insertion opening and the attachment opening and protruding from the additional sliding surface to be slidable with the outer circumferential periphery of the head portion.

4. The bicycle chain connecting link according to claim 3, wherein
a total length of the additional guiding portion and the additional protrusion is defined in the axial direction, and
the total length of the additional guiding portion and the additional protrusion is longer than the minimum axial distance defined between the head portion and the main-body in the axial direction.

5. The bicycle chain connecting link according to claim 3, wherein
the additional guiding portion is spaced apart from the guiding portion to define, between the guiding portion and the additional guiding portion, a sliding passage through which the intermediate portion of the link pin is to pass,
the additional protrusion is spaced apart from the protrusion to define a minimum distance between the protrusion and the additional protrusion, and
the minimum distance between the protrusion and the additional protrusion is shorter than the outer diameter of the head portion.

6. The bicycle chain connecting link according to claim 5, wherein
the additional guiding portion is spaced apart from the guiding portion to define a sliding-passage width between the guiding portion and the additional guiding portion, and
the minimum distance between the protrusion and the additional protrusion is longer than the sliding-passage width defined at a position at which the minimum distance is defined when viewed from the axial direction.

7. The bicycle chain connecting link according to claim 1, wherein
the link plate further comprises a tapered surface inclined with respect to an axial direction parallel to the center axis to guide the head portion into the insertion opening.

8. A bicycle chain connecting link comprising:
a first link pin having a first center axis and comprising:
    a first main-body extending along the first center axis;
    a first head portion spaced apart from the first main-body along the first center axis; and
    a first intermediate portion provided between the first main-body and the first head portion and coupling the first head portion to the first main-body, the first intermediate portion having an outer diameter smaller than an outer diameter of the first main-body and than an outer diameter of the first head portion to define a first groove between the first main-body and the first head portion;

a second link pin having a second center axis and comprising:
    a second main-body extending along the second center axis;
    a second head portion spaced apart from the second main-body along the second center axis; and
    a second intermediate portion provided between the second main-body and the second head portion and coupling the second head portion to the second main-body, the second intermediate portion having an outer diameter smaller than an outer diameter of the second main-body and than an outer diameter of the second head portion to define a second groove between the second main-body and the second head portion;

a first link plate comprising:
    a first securing portion to which the first main-body of the first link pin is secured; and
    a first elongated opening to which the second link pin is removably attached, the first elongated opening comprising:
        a first insertion opening; and
        a first attachment opening connected with the first insertion opening;
    a first guiding portion protruding inwardly from an inner periphery of the first elongated opening and configured to engage with the second groove of the second link pin to guide the second link pin between the first insertion opening and the first attachment opening, the first guiding portion including a first sliding surface slidable with the second head portion; and
    a first protrusion provided between the first insertion opening and the first attachment opening and protruding from the first sliding surface to be slidable with an outer circumferential periphery of the second head portion, the first protrusion having a convex shape to increase sliding resistance when the outer circumferential periphery of the second head portion moves between the first insertion opening and the first attachment opening; and a second link plate comprising:
    a second securing portion to which the second main-body of the second link pin is secured; and
    a second elongated opening to which the first link pin is removably attached.

9. The bicycle chain connecting link according to claim 8, wherein
    a first total length of the first guiding portion and the first protrusion is defined in a first axial direction parallel to the first center axis, and
    the first total length is longer than a second minimum axial distance defined between the second head portion and the second main-body in a second axial direction parallel to the second center axis.

10. The bicycle chain connecting link according to claim 9, wherein
    the first link plate further comprises
        a first additional guiding portion protruding inwardly from the inner periphery of the first elongated opening and configured to engage with the second groove of the second link pin to guide the second link pin between the first insertion opening and the first attachment opening, the first additional guiding portion including a first additional sliding surface slidable with the second head portion, and
        a first additional protrusion provided between the first insertion opening and the first attachment opening and protruding from the first additional sliding surface to be slidable with the outer circumferential periphery of the second head portion,
    a second total length of the first additional guiding portion and the first additional protrusion is defined in the first axial direction, and
    the second total length is longer than the second minimum axial distance defined between the second head portion and the second main-body in the second axial direction.

11. The bicycle chain connecting link according to claim 9, wherein
    the first additional guiding portion is spaced apart from the first guiding portion to define, between the first guiding portion and the first additional guiding portion, a first sliding passage through which the second intermediate portion of the second link pin is to pass,
    the first additional protrusion is spaced apart from the first protrusion to define a first minimum distance between the first protrusion and the first additional protrusion, and
    the first minimum distance is shorter than the outer diameter of the second head portion.

12. The bicycle chain connecting link according to claim 11, wherein
    the first additional guiding portion is spaced apart from the first guiding portion to define a first sliding-passage width between the first guiding portion and the first additional guiding portion, and
    the first minimum distance is longer than the first sliding-passage width defined at a position at which the first minimum distance is defined when viewed from the first axial direction.

13. The bicycle chain connecting link according to claim 8, wherein
    the first link plate further comprises a first outer surface and a first inner surface opposite to the first outer surface in a first axial direction parallel to the first center axis,
    the first inner surface is closer to the first head portion than the first outer surface in the first axial direction, and
    the first protrusion has a first surface facing in the first axial direction and disposed at a position same as the first outer surface in the first axial direction.

14. The bicycle chain connecting link according to claim 8, wherein
    the first link plate further comprises a first outer surface and a first inner surface opposite to the first outer surface in a first axial direction parallel to the first center axis,
    the first inner surface is closer to the first head portion than the first outer surface in the first axial direction, and
    the first protrusion has a first surface facing in the first axial direction and disposed at a position different from the first outer surface in the first axial direction.

15. The bicycle chain connecting link according to claim 8, wherein
    the first link plate further comprises a first tapered surface inclined with respect to a first axial direction parallel to the first center axis to guide the second head portion into the first insertion opening.

16. A bicycle chain connecting link comprising:
    a first link pin having a first center axis and comprising:
        a first main-body extending along the first center axis;
        a first head portion spaced apart from the first main-body along the first center axis; and
        a first intermediate portion provided between the first main-body and the first head portion and coupling the first head portion to the first main-body, the first intermediate portion having an outer diameter smaller than an outer diameter of the first main-body and than an outer diameter of the first head portion to define a first groove between the first main-body and the first head portion;

a second link pin having a second center axis and comprising:
    a second main-body extending along the second center axis;
    a second head portion spaced apart from the second main-body along the second center axis; and
    a second intermediate portion provided between the second main-body and the second head portion and coupling the second head portion to the second main-body, the second intermediate portion having an outer diameter smaller than an outer diameter of the second main-body and than an outer diameter of the second head portion to define a second groove between the second main-body and the second head portion;

a first link plate comprising:
    a first securing portion to which the first main-body of the first link pin is secured; and
    a first elongated opening to which the second link pin is removably attached, the first elongated opening comprising:
        a first insertion opening; and
        a first attachment opening connected with the first insertion opening;
    a first guiding portion protruding inwardly from an inner periphery of the first elongated opening and configured to engage with the second groove of the second link pin to guide the second link pin between the first insertion opening and the first attachment opening, the first guiding portion including a first sliding surface slidable with the second head portion; and
    a first protrusion provided between the first insertion opening and the first attachment opening and protruding from the first sliding surface to be slidable with an outer periphery of the second head portion; and a second link plate comprising:
    a second securing portion to which the second main-body of the second link pin is secured; and
    a second elongated opening to which the first link pin is removably attached, wherein the first link plate further comprises a first tapered surface inclined with respect to a first axial direction parallel to the first center axis to guide the second head portion into the first insertion opening, the first link plate further comprises a first outer surface and a first inner surface opposite to the first outer surface in the first axial direction, the first inner surface is closer to the first head portion than the first outer surface in the first axial direction, and the first tapered surface is inclined with respect to the first axial direction such that an inner radius defined by the first tapered surface gradually decreases from the first inner surface toward the first outer surface.

17. The bicycle chain connecting link according to claim 8, wherein
the first link plate further comprises a first outer surface and a first inner surface opposite to the first outer surface in a first axial direction parallel to the first center axis,
the first inner surface is closer to the first head portion than the first outer surface in the first axial direction, and
the first link plate includes a first stopper protruding from the first inner surface and provided between the first securing portion and the first elongated opening.

18. The bicycle chain connecting link according to claim 17, wherein
the first elongated opening is spaced apart from the first securing portion in a first longitudinal direction of the first link plate, and
the first stopper includes a first restricting surface to restrict a relative movement between the first link plate and an inner link plate in the first longitudinal direction.

19. The bicycle chain connecting link according to claim 17, wherein
the first stopper is provided by one of punching and cutting.

20. The bicycle chain connecting link according to claim 19, wherein
the first stopper is formed so that an inner periphery of the first insertion opening is at least partially raised.

21. The bicycle chain connecting link according to claim 8, wherein
the first link plate includes a first cutout provided on the inner periphery of the first elongated opening and disposed between the first securing portion and the first elongated opening.

22. The bicycle chain connecting link according to claim 8, wherein
the second elongated opening comprises
    a second insertion opening, and
    a second attachment opening connected with the second insertion opening, and
the second link plate further comprises
    a second guiding portion protruding inwardly from an inner periphery of the second elongated opening and configured to engage with the first groove of the first link pin to guide the first link pin between the second insertion opening and the second attachment opening, the second guiding portion including a second sliding surface slidable with the first head portion, and
    a second protrusion provided between the second insertion opening and the second attachment opening and protruding from the second sliding surface to be slidable with an outer periphery of the first head portion.

23. The bicycle chain connecting link according to claim 22, wherein
a third total length of the second guiding portion and the second protrusion is defined in a second axial direction parallel to the second center axis, and
the third total length is longer than a first minimum axial distance defined between the first head portion and the first main-body in a first axial direction parallel to the first center axis.

24. A bicycle chain connecting link comprising:
a first link pin having a first center axis and comprising:
    a first main-body extending along the first center axis;
    a first head portion spaced apart from the first main-body along the first center axis; and
    a first intermediate portion provided between the first main-body and the first head portion and coupling the first head portion to the first main-body, the first intermediate portion having an outer diameter smaller than an outer diameter of the first main-body and than an outer diameter of the first head portion to define a first groove between the first main-body and the first head portion;
a second link pin having a second center axis and comprising:

a second main-body extending along the second center axis;
a second head portion spaced apart from the second main-body along the second center axis; and
a second intermediate portion provided between the second main-body and the second head portion and coupling the second head portion to the second main-body, the second intermediate portion having an outer diameter smaller than an outer diameter of the second main-body and than an outer diameter of the second head portion to define a second groove between the second main-body and the second head portion;
a first link plate comprising:
a first securing portion to which the first main-body of the first link pin is secured;
a first elongated opening to which the second link pin is removably attached, the first elongated opening comprising:
a first insertion opening into which the second head portion is to be inserted when the second link pin is attached to the first link plate; and
a first attachment opening connected with the first insertion opening;
a first inner surface;
a first outer surface opposite to the first inner surface with respect to a first axial direction parallel to the first center axis, the first inner surface being closer to the head portion than the outer surface; and
a first tapered surface provided on the first inner surface and inclined with respect to the first axial direction to guide the second head portion into the first insertion opening; and
a second link plate comprising:
a second securing portion to which the second main-body of the second link pin is secured; and
a second elongated opening to which the first link pin is removably attached.

25. A bicycle chain connecting link comprising:
a first link pin having a first center axis and comprising:
a first main-body extending along the first center axis;
a first head portion spaced apart from the first main-body along the first center axis; and
a first intermediate portion provided between the first main-body and the first head portion and coupling the first head portion to the first main-body, the first intermediate portion having an outer diameter smaller than an outer diameter of the first main-body and than an outer diameter of the first head portion to define a first groove between the first main-body and the first head portion;
a second link pin having a second center axis and comprising:
a second main-body extending along the second center axis;
a second head portion spaced apart from the second main-body along the second center axis; and
a second intermediate portion provided between the second main-body and the second head portion and coupling the second head portion to the second main-body, the second intermediate portion having an outer diameter smaller than an outer diameter of the second main-body and than an outer diameter of the second head portion to define a second groove between the second main-body and the second head portion;
a first link plate comprising:
a first securing portion to which the first main-body of the first link pin is secured;
a first elongated opening to which the second link pin is removably attached, the first elongated opening comprising:
a first insertion opening into which the second head portion is to be inserted when the second link pin is attached to the first link plate; and
a first attachment opening connected with the first insertion opening; and
a first tapered surface inclined with respect to a first axial direction parallel to the first center axis to guide the second head portion into the first insertion opening; and
a second link plate comprising:
a second securing portion to which the second main-body of the second link pin is secured; and
a second elongated opening to which the first link pin is removably attached, wherein
the first link plate further comprises
a first outer surface; and
a first inner surface opposite to the first outer surface in the first axial direction, the first inner surface being closer to the first head portion than the first outer surface in a first axial direction parallel to the first center axis, and
an inner radius defined by the first tapered surface gradually decreases from the first inner surface toward the first outer surface.

26. The bicycle chain connecting link according to claim 25, wherein
the first link plate includes a first stopper protruding from the first inner surface and provided between the first securing portion and the first elongated opening.

27. The bicycle chain connecting link according to claim 26, wherein
the first elongated opening is spaced apart from the first securing portion in a first longitudinal direction of the first link plate, and
the first stopper includes a first restricting surface to restrict a relative movement between the first link plate and an inner link plate in the first longitudinal direction.

28. The bicycle chain connecting link according to claim 26, wherein
the first stopper is provided by one of punching and cutting.

29. The bicycle chain connecting link according to claim 28, wherein
the first stopper is formed so that an inner periphery of the first insertion opening is at least partially raised.

30. The bicycle chain connecting link according to claim 24, wherein
the first link plate includes a first cutout provided on an inner periphery of the first elongated opening and disposed between the first securing portion and the first elongated opening.

31. A bicycle chain connecting link comprising:
a first link pin having a first center axis and comprising:
a first main-body extending along the first center axis;
a first head portion spaced apart from the first main-body along the first center axis; and
a first intermediate portion provided between the first main-body and the first head portion and coupling the first head portion to the first main-body, the first intermediate portion having an outer diameter smaller than an outer diameter of the first main-body and than an outer diameter of the first head portion to define a first groove between the first main-body and the first head portion;

a second link pin having a second center axis and comprising:
  a second main-body extending along the second center axis;
  a second head portion spaced apart from the second main-body along the second center axis; and
  a second intermediate portion provided between the second main-body and the second head portion and coupling the second head portion to the second main-body, the second intermediate portion having an outer diameter smaller than an outer diameter of the second main-body and than an outer diameter of the second head portion to define a second groove between the second main-body and the second head portion;
a first link plate comprising:
  a first securing portion to which the first main-body of the first link pin is secured;
  a first elongated opening to which the second link pin is removably attached, the first elongated opening comprising:
    a first insertion opening into which the second head portion is to be inserted when the second link pin is attached to the first link plate; and
    a first attachment opening connected with the first insertion opening; and
  a first tapered surface inclined with respect to a first axial direction parallel to the first center axis to guide the second head portion into the first insertion opening; and
a second link plate comprising:
  a second securing portion to which the second main-body of the second link pin is secured; and
  a second elongated opening to which the first link pin is removably attached, wherein the second link plate further comprises
    a second outer surface, and
    a second inner surface opposite to the second outer surface in a second axial direction parallel to the second center axis, the second inner surface being closer to the second head portion than the second outer surface in the second axial direction,
  the second elongated opening comprises
    a second insertion opening into which the first head portion is to be inserted when the first link pin is attached to the second link plate, and
    a second attachment opening connected with the second insertion opening, and
  the second link plate further comprises a second tapered surface inclined with respect to the second axial direction to guide the first head portion into the second insertion opening, an inner radius defined by the second tapered surface gradually decreasing from the second inner surface toward the second outer surface.

32. A bicycle chain connecting link comprising:
a link pin having a center axis and comprising:
  a main-body extending along the center axis;
  a head portion spaced apart from the main-body along the center axis; and
  an intermediate portion provided between the main-body and the head portion and coupling the head portion to the main-body, the intermediate portion having an outer diameter smaller than an outer diameter of the main-body and than an outer diameter of the head portion to define a groove between the main-body and the head portion; and
a link plate comprising:
  an elongated opening comprising:
    an insertion opening into which the head portion is to be inserted when the link pin is attached to the link plate; and
    an attachment opening connected with the insertion opening;
  an inner surface;
  an outer surface opposite to the inner surface with respect to an axial direction parallel to the center axis, the inner surface being closer to the head portion than the outer surface; and
  a tapered surface provided on the inner surface and inclined with respect to the axial direction to guide the head portion into the insertion opening.

33. A bicycle chain connecting link comprising:
a link pin having a center axis and comprising:
  a main-body extending along the center axis;
  a head portion spaced apart from the main-body along the center axis; and
  an intermediate portion provided between the main-body and the head portion and coupling the head portion to the main-body, the intermediate portion having an outer diameter smaller than an outer diameter of the main-body and than an outer diameter of the head portion to define a groove between the main-body and the head portion; and
a link plate comprising:
  an elongated opening comprising:
    an insertion opening into which the head portion is to be inserted when the link pin is attached to the link plate; and
    an attachment opening connected with the insertion opening; and
  a tapered surface inclined with respect to an axial direction to guide the head portion into the insertion opening, the axial direction being parallel to the center axis, wherein
the link plate further comprises an outer surface and an inner surface opposite to the outer surface in the axial direction, and
an inner radius defined by the tapered surface gradually decreases from the inner surface toward the outer surface.

* * * * *